United States Patent
Sankey et al.

(10) Patent No.: US 12,164,485 B1
(45) Date of Patent: Dec. 10, 2024

(54) TECHNIQUES FOR OPTIMIZING PROJECT DATA STORAGE

(71) Applicant: Northspyre, Inc., Brooklyn, NY (US)

(72) Inventors: William Sankey, Atlanta, GA (US); Matthew Phinney, Brooklyn, NY (US)

(73) Assignee: Northspyre, Inc., Brooklyn, NY (US)

( * ) Notice: Subject to any disclaimer, the term of this patent is extended or adjusted under 35 U.S.C. 154(b) by 0 days.

(21) Appl. No.: 18/423,710

(22) Filed: Jan. 26, 2024

(51) Int. Cl.
*G06F 16/21* (2019.01)
*G06F 16/28* (2019.01)

(52) U.S. Cl.
CPC .......... *G06F 16/211* (2019.01); *G06F 16/287* (2019.01)

(58) Field of Classification Search
None
See application file for complete search history.

(56) References Cited

U.S. PATENT DOCUMENTS

| | | | | |
|---|---|---|---|---|
| 7,509,589 | B2* | 3/2009 | Hallisey | G06F 3/0482 |
| | | | | 711/111 |
| 7,657,545 | B2* | 2/2010 | Bird | G06F 16/289 |
| | | | | 707/999.1 |
| 8,768,976 | B2* | 7/2014 | McLachlan | G06Q 10/10 |
| | | | | 707/805 |
| 2005/0132304 | A1* | 6/2005 | Guido | G06F 16/904 |
| | | | | 715/854 |
| 2011/0249002 | A1* | 10/2011 | Duplessis | G06T 11/206 |
| | | | | 345/440 |
| 2016/0307342 | A1* | 10/2016 | Lee | G06T 11/40 |
| 2017/0011105 | A1* | 1/2017 | Shet | G06Q 30/06 |
| 2019/0197442 | A1* | 6/2019 | Lu | G06Q 20/4016 |
| 2021/0342785 | A1* | 11/2021 | Mann | G06Q 10/06313 |
| 2021/0365968 | A1* | 11/2021 | Narula | G06Q 30/0201 |

OTHER PUBLICATIONS

Dolado JJ, Rodríguez D, Riquelme J, Ferrer-Troyano F, Cuadrado JJ. A two-stage zone regression method for global characterization of a project database. InAdvances in machine learning applications in software engineering 2007 (pp. 1-13). IGI Global. (Year: 2007).*

* cited by examiner

*Primary Examiner* — Uyen T Le
(74) *Attorney, Agent, or Firm* — MARSHALL, GERSTEIN & BORUN LLP

(57) ABSTRACT

Techniques for optimizing project data storage are disclosed. An example system includes processors and memories communicatively coupled with the processors storing a trained machine learning (ML) model, a nesting data module, a project database, and instructions that cause the processors to: receive a first data category corresponding to a project, execute the trained ML model to determine a predicted data category mapping for the first data category, execute the nesting data module to: input the first data category into a first table having a first file size, collapse the first table with a second table that includes a second data category that is related to the first data category to generate a nested table, and store the nested table in the project database. The nested table has a file size that is less than a combined file size of the first table and the second table.

20 Claims, 13 Drawing Sheets

310

| Id | Path | Name | project_name |
|---|---|---|---|
| 1 | 1 | Hard Costs | Null |
| 2 | 2 | Soft Costs | Null |
| 3 | 3 | Acquisition Costs | Null |
| 4 | 2.4 | Marketing | Null |
| 5 | 2.5 | General Administrative & Overhead | Null |
| 6 | 3.6 | Legal Services-Acquisition Loan | Null |
| 7 | 2.4.7 | Marketing Events | 280.08-Public Relations/Marketing Events |
| 8 | 2.5.8 | Project Software And Applications | 2.02.05-Project Management Software |

FIG. 3
(Continued)

TECHNIQUES FOR OPTIMIZING PROJECT DATA STORAGE

FIELD OF THE DISCLOSURE

The present disclosure generally relates to optimizing data storage, and more particularly, to techniques for optimizing project data storage by leveraging trained machine learning (ML) models to determine predicted data categories and nesting data category tables based on these predicted data categories.

BACKGROUND

Organizing data and optimizing data storage are concepts of great interest across a wide variety of industries. The commercial real estate (CRE) industry, for example, typically uses a myriad of data entries/categorizations (termed "budget lines") to track the various commitments for a particular project. Such data categories can be highly specific and used to track granular level project costs/commitments. As one example, the data category "Signage-Non marketing" may be used to track the cost of signage for a particular project.

The set of relevant data categories may vary for every project, and there are hundreds of different data categories that may be used in any particular industry or any particular entity within an industry. However, there is no standardization for how these data categories are named, leading to different categorizations applied to identical/similar data types across projects for individual entities and across entire industries. Accordingly, standardizing these data categories is particularly challenging because each industry/entity may use their own data categories with vastly different naming conventions to reference an identical/similar data type without any link or commonality between/among the different naming conventions.

Moreover, these non-standardized data categorizations of conventional techniques can lead to significant storage capacity issues. When entities haphazardly or otherwise create a multitude of various data categorizations referencing identical/similar data types, the data for each of these different data categorizations is frequently stored in different tables or other unique storage formats/files (e.g., documents, charts, graphs, etc.). Thus, the various tables and other unique storage formats/files dedicated to the different data categorizations consume considerably more storage space (e.g., MB/TB of data) than if these different data categorizations were condensed into a smaller number of such data categorizations, resulting in a correspondingly smaller number of tables, storage formats/files, etc. to store the associated data.

In an effort to simply avoid/ignore these challenges, conventional techniques for data categorization/tracking typically provide a rigid set of data categories or provide complete flexibility to name data categories. In other words, these conventional techniques either force users/entities to use a pre-determined set of data categories or allow users/entities to continue using their various different naming conventions. Thus, these conventional techniques ignore the data storage challenges presented by such conventional data categorization and prevent users/entities from gleaning valuable insights from their data tracking across projects (or indeed, across entities/industries) because the resulting data categories are either too broad or too varied to provide meaningful insights.

Accordingly, there is a need for techniques for optimizing project data storage by leveraging trained machine learning (ML) models to determine predicted data categories and nesting data category tables based on these predicted data categories to optimize the storage capacity of project computing resources and create standardized data categorizations that encompass all relevant project data types without sacrificing flexibility for the user/entity.

SUMMARY

In some aspects, the techniques described herein relate to a system for optimizing project data storage including: one or more processors; and one or more memories communicatively coupled with the one or more processors, the one or more memories storing a trained machine learning (ML) model, a nesting data module, a project database, and computer executable instructions that, when executed by the one or more processors, cause the one or more processors to: receive a first data category corresponding to a project, execute the trained ML model to determine a predicted data category mapping for the first data category that maps the first data category to a normalized data category, wherein the trained ML model is trained using a plurality of training data categories and a plurality of training normalized data categories as input to output a plurality of training predicted data category mappings, execute, based on the predicted data category mapping, the nesting data module configured to: input the first data category into a first table having a first file size, and collapse the first table with a second table that includes a second data category that is related to the first data category to generate a nested table, wherein the second table has a second file size, and the nested table has a third file size that is less than a combination of the first file size and the second file size, and store the nested table in the project database.

In some aspects, the techniques described herein relate to a system, wherein the computer executable instructions, when executed by the one or more processors, further cause the one or more processors to: receive an external input corresponding to the project; execute an external input analysis model trained to: extract external data from the external input, and analyze the external data to output (i) a predicted classification and (ii) a predicted impact associated with the project; and cause a user computing device to display the predicted classification and the predicted impact to a user.

In some aspects, the techniques described herein relate to a system, wherein the computer executable instructions, when executed by the one or more processors, further cause the one or more processors to: determine a classification of the external input based on the predicted classification; update an entry of a data category within the nested table based on the classification; and adjust an estimated value within the nested table based on the predicted impact.

In some aspects, the techniques described herein relate to a system, wherein the computer executable instructions, when executed by the one or more processors, further cause the one or more processors to: analyze one or more external inputs to identify request data included as part of the one or more external inputs; extract the request data from the one or more external inputs; execute a draw request model to identify whether the request data conforms to each of a set of consolidation rules; and responsive to determining that the request data conforms to each of the set of consolidation rules, generate, using the request data, a draw request that is formatted based on the set of consolidation rules.

In some aspects, the techniques described herein relate to a system, wherein the one or more external inputs are in a plurality of different formats when analyzed by the one or more processors, and the computer executable instructions, when executed by the one or more processors, further cause the one or more processors to: convert the one or more external inputs from the plurality of different formats to a normalized format.

In some aspects, the techniques described herein relate to a system, wherein the computer executable instructions, when executed by the one or more processors, further cause the one or more processors to: render a project projection graphical user interface (GUI) configured to display data stored within the nested table; receive updated project data; determine that the updated project data violates a threshold value corresponding to a respective data category represented in the project projection GUI; and adjust a graphical display element of the project projection GUI corresponding to the respective data category based on the updated project data violating the threshold value.

In some aspects, the techniques described herein relate to a system, wherein the computer executable instructions, when executed by the one or more processors, further cause the one or more processors to: predict, by executing a retainage model, a retainage value based on data included in the nested table; receive updated data to be stored in the nested table; generate, by executing the retainage model using the updated data as inputs, an updated retainage value; and cause a user computing device to display the updated retainage value to a user.

In some aspects, the techniques described herein relate to a system, wherein the computer executable instructions, when executed by the one or more processors, further cause the one or more processors to: generate an estimated project completion value based on data included in the nested table; transmit the estimated project completion value to an external computing device; receive, from the external computing device, an adjusted project completion value; and determine an updated project completion value based on the estimated project completion value and the adjusted project completion value.

In some aspects, the techniques described herein relate to a system, wherein the computer executable instructions, when executed by the one or more processors, further cause the one or more processors to: cause a user computing device to render a project graphical user interface (GUI) that includes the nested table for access by a user of the user computing device; and responsive to receiving input from the user, execute the nesting data module to expand the nested table into the first table and the second table.

In some aspects, the techniques described herein relate to a computer-implemented method for optimizing project data storage including: receiving, at one or more processors, a first data category corresponding to a project; determining, by the one or more processors executing a trained machine learning (ML) model, a predicted data category mapping for the first data category that maps the first data category to a normalized data category, wherein the trained ML model is trained using a plurality of training data categories and a plurality of training normalized data categories as input to output a plurality of training predicted data category mappings; executing, by the one or more processors and based on the predicted data category mapping, a nesting data module configured to: input the first data category into a first table, and collapse the first table with a second table that includes a second data category corresponding to the project to generate a nested table; and storing, by the one or more processors, the nested table in a database.

In some aspects, the techniques described herein relate to a computer-implemented method, further including: receiving, at the one or more processors, an external input corresponding to the project; executing, by the one or more processors, an external input analysis model trained to: extract external data from the external input, and analyze the external data to output (i) a predicted classification and (ii) a predicted impact associated with the project; and causing, by the one or more processors, a user computing device to display the predicted classification and the predicted impact to a user.

In some aspects, the techniques described herein relate to a computer-implemented method, further including: determining, by the one or more processors, a classification of the external input based on the predicted classification; updating, by the one or more processors, an entry of a data category within the nested table based on the classification; and adjusting, by the one or more processors, an estimated value within the nested table based on the predicted impact.

In some aspects, the techniques described herein relate to a computer-implemented method, further including: analyzing, by the one or more processors, one or more external inputs to identify request data included as part of the one or more external inputs; extracting, by the one or more processors, the request data from the one or more external inputs; executing, by the one or more processors, a draw request model to identify whether the request data conforms to each of a set of consolidation rules; and responsive to determining that the request data conforms to each of the set of consolidation rules, generating, by the one or more processors using the request data, a draw request that is formatted based on the set of consolidation rules.

In some aspects, the techniques described herein relate to a computer-implemented method, wherein the one or more external inputs are in a plurality of different formats when analyzed by the one or more processors, and the method further includes: converting, by the one or more processors, the one or more external inputs from the plurality of different formats to a normalized format.

In some aspects, the techniques described herein relate to a computer-implemented method, further including: rendering, by the one or more processors, a project projection graphical user interface (GUI) configured to display data stored within the nested table; receiving, at the one or more processors, updated project data; determining, by the one or more processors, that the updated project data violates a threshold value corresponding to a respective data category represented in the project projection GUI; and adjusting, by the one or more processors, a graphical display element of the project projection GUI corresponding to the respective data category based on the updated project data violating the threshold value.

In some aspects, the techniques described herein relate to a computer-implemented method, further including: predicting, by the one or more processors executing a retainage model, a retainage value based on data included in the nested table; receiving, at the one or more processors, updated data to be stored in the nested table; generating, by the one or more processors executing the retainage model using the updated data as inputs, an updated retainage value; and causing, by the one or more processors, a user computing device to display the updated retainage value to a user.

In some aspects, the techniques described herein relate to a computer-implemented method, further including: generating, by the one or more processors, an estimated project completion value based on data included in the nested table; transmitting, by the one or more processors, the estimated project completion value to an external computing device; receiving, at the one or more processors from the external computing device, an adjusted project completion value; and determining, by the one or more processors, an updated project completion value based on the estimated project completion value and the adjusted project completion value.

In some aspects, the techniques described herein relate to a computer-implemented method, further including: causing, by the one or more processors, a user computing device to render a project graphical user interface (GUI) that includes the nested table for access by a user of the user computing device; and responsive to receiving input from the user, executing, by the one or more processors, the nesting data module to expand the nested table into the first table and the second table.

In some aspects, the techniques described herein relate to a tangible machine-readable medium including instructions that, when executed, cause a machine to at least: receive a first data category corresponding to a project; execute a trained ML model to determine a predicted data category mapping for the first data category that maps the first data category to a normalized data category, wherein the trained ML model is trained using a plurality of training data categories and a plurality of training normalized data categories as input to output a plurality of training predicted data category mappings; execute, based on the predicted data category mapping, a nesting data module configured to: input the first data category into a first table having a first file size, and collapse the first table with a second table that includes a second data category that is related to the first data category to generate a nested table, wherein the second table has a second file size, and the nested table has a third file size that is less than a combination of the first file size and the second file size; and store the nested table in a project database.

In some aspects, the techniques described herein relate to a tangible machine-readable medium, wherein the instructions, when executed, further cause the machine to at least: receive an external input corresponding to the project; execute an external input analysis model trained to: extract external data from the external input, analyze the external data to output (i) a predicted classification and (ii) a predicted impact associated with the project, and determine a classification of the external input based on the predicted classification; update an entry of a data category within the nested table based on the classification; adjust an estimated value within the nested table based on the predicted impact; and cause a user computing device to display the predicted classification and the predicted impact to a user.

In accordance with the above, and with the disclosure herein, the present disclosure includes improvements in computer functionality or in improvements to other technologies at least because the disclosure describes that, e.g., a hosting server or otherwise computing device (e.g., a user computing device), is improved where the intelligence or predictive ability of the hosting server or computing device is enhanced by a trained machine learning model. This model, executing on the hosting server or computing device, is able to accurately and efficiently generate predicted data category mappings that map input data categories to normalized/standardized data categories. That is, the present disclosure describes improvements in the functioning of the computer itself or "any other technology or technical field" because a hosting server or computing device, is enhanced with a trained machine learning model to accurately detect, evaluate, and predict data category mappings to normalized data categories that optimize project data storage and corresponding data storage capacity requirements. This improves over the prior art at least because existing systems lack such evaluative and/or predictive functionality and are generally unable to analyze such input data categories to output predictive and/or otherwise recommended data categories designed to optimize project data storage and/or corresponding data storage capacity requirements.

Additionally, the techniques of the present disclosure improve the functioning of a computer by providing a nesting data module. The nesting data module is configured to further optimize the project data storage capacity requirements through creation of nested data tables. In particular, the nesting data module may generate a nested table by collapsing a first table including a first data category with a second table that includes a second data category that is related to the first data category. Each of the first table and the second table have a corresponding file size, and the nested table has a file size that is less than a combination of the file sizes of the first table and the second table. Thus, storing the nested table instead of the first table and the second table individually conserves storage resources by requiring less storage capacity to store the same data. Accordingly, the techniques of the present disclosure improve the functioning of a computer, as compared to conventional techniques, at least because such conventional techniques lack the nesting data module or similar functionality, and correspondingly require more data storage capacity/memory resources than the techniques of the present disclosure.

Further, the present disclosure includes improvements to other technologies or technical fields at least because the present disclosure describes or introduces improvements in the field of project data storage/management/analytics. Namely, the trained machine learning model and/or the nesting data module executing on the server or other computing devices (e.g., user computing device) improves the field of project data storage/management/analytics by introducing the capability to predict/standardize data categories and optimize data storage capacity requirements in a manner that was previously unachievable using conventional techniques. This improves over conventional techniques at least because such techniques lack the ability to predict/standardize data categories and are otherwise simply not capable of optimizing data storage capacity requirements.

As mentioned, the model(s) may be trained using machine learning and may utilize machine learning during operation. Therefore, in these instances, the techniques of the present disclosure may further include improvements in computer functionality or in improvements to other technologies at least because the disclosure describes such models being trained with a plurality of training data (e.g., 10,000 s of training data corresponding to data categories, normalized data categories, etc.) to output the predicted data category mappings configured to optimize project data storage and corresponding data storage capacity requirements.

Moreover, the present disclosure includes effecting a transformation or reduction of a particular article to a different state or thing, e.g., transforming or reducing the data storage capacity requirements and data categorization mappings from a non-optimal or error state to an optimal state by predicting a data categorization mapping for each input data category and nesting data tables together based on such data categorization mappings.

In addition, the present disclosure includes specific features other than what is well-understood, routine, conventional activity in the field, or adding unconventional steps that confine the claim to a particular useful application, e.g., executing a trained ML model to determine a predicted data category mapping for the first data category that maps the first data category to a normalized data category; executing, based on the predicted data category mapping, the nesting data module configured to: input the first data category into a first table having a first file size, and collapse the first table with a second table that includes a second data category that is related to the first data category to generate a nested table, wherein the second table has a second file size, and the nested table has a third file size that is less than a combination of the first file size and the second file size; and/or storing the nested table in the project database, among others.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein. Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive and/or limiting.

DETAILED DESCRIPTION OF THE INVENTION

Generally speaking, the techniques of the present disclosure evaluate input data categories to determine optimal normalized/standardized data categories corresponding to the input data categories and nesting data category tables containing data from these various normalized data categories. Consequently, the techniques of the present disclosure provide users the flexibility of naming data categories as they see fit while also maintaining a level of standardization sufficient to enable meaningful insight generation, as well as reduce the storage resource demand of the project management system. In this manner, the techniques of the present disclosure improve over conventional techniques by optimizing the storage capacity of project computing resources and creating/applying standardized data categorizations that encompass all relevant project data types in a manner that was previously impossible with such conventional techniques.

Figure 1:
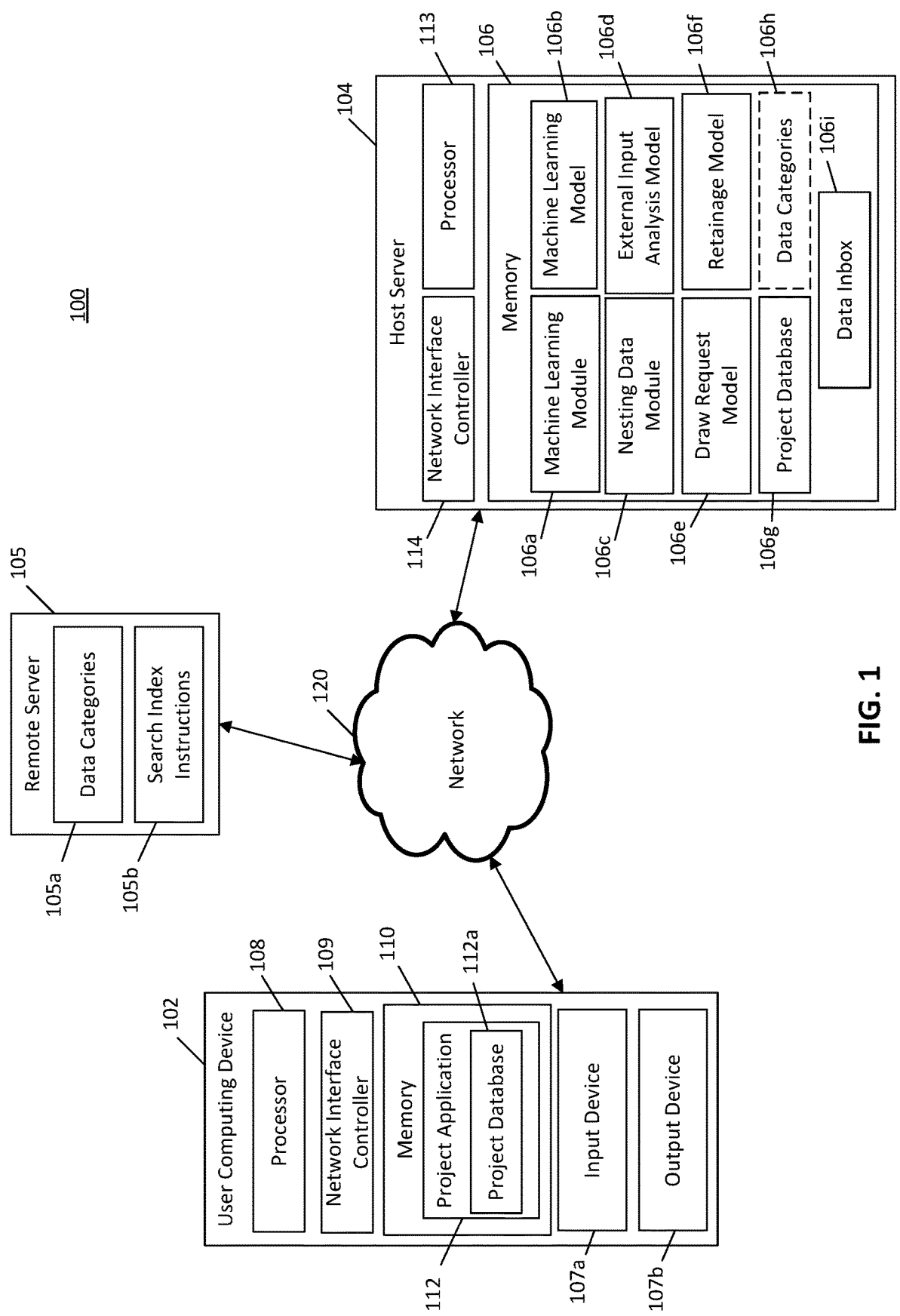
FIG. 1 illustrates an example computing environment for optimizing project data storage, in accordance with various embodiments described herein.

FIG. 1 depicts an example computing environment 100 for optimizing project data storage, in accordance with various embodiments described herein. The computing environment 100 includes a user computing device 102, a host server 104, a remote server 105, and a network 120. Some embodiments may include a plurality of user computing devices 102, a plurality of host servers 104, and/or a plurality of remote servers 105.

The user computing device 102 may include a processor 108, a network interface controller 109, and a memory 110. The memory 110 stores a project application 112 and a project database 112a. In certain embodiments, the project database 112a is included as part of the project application 112, and the project database 112a may be similar/identical to the project database 106g stored on the memory 106 of the host server 104.

The user computing device 102 may also include an input device 107a, and an output device 107b. The input device 107a may include any suitable device or devices for receiving input, such as one or more microphone, one or more camera, a hardware keyboard, a hardware mouse, a capacitive touch screen, etc. The output device 107b may include any suitable device for conveying output, such as a hardware speaker, a computer monitor, a touch screen, etc. In some cases, the input device 107a and the output device 107b may be integrated into a single device, such as a touch screen device that accepts user input and displays output. The user computing device 102 may communicate with the host server 104 and the remote server 105 across the network 120 via the network interface controller 109.

Generally, the host server 104 may include a memory 106, a processor 113, and a network interface controller 114. The memory 106 may store a ML module 106a, a machine learning model 106b, a nesting data module 106c, an external input analysis model 106d, a draw request model 106e, a retainage model 106f, a project database 106g, a set of data categories 106h, and/or a data inbox 106i. Broadly, the host server 104 may execute/access each of the models/modules 106a-f and other stored data (e.g., 106g, 106h, 106i) to determine predicted category mappings for input data categories, generate nested tables of mapped data categories, actively update values/date/categories within these tables over time as new data is received, and/or otherwise provide insights related to the data input by a user and/or otherwise received at the host server 104. As referenced herein, each of the models/modules 106*a-f* may be trained with and/or otherwise utilize artificial intelligence (AI) and/or machine learning (ML) techniques.

For example, the machine learning model 106*b* may be a trained ML model 106*b* configured to determine a predicted data category mapping for a first data category that maps the first data category to a normalized data category. These data categories, as referenced herein, may generally indicate a category or type of data that may be aggregated, collected, and/or stored together. The normalized data categories, as referenced herein, may indicate broader categories/types of data, into which, other data categories (e.g., user input data categories) may be grouped. As an example, a first data category provided to the trained ML model 106*b* may be "Permanent Signage" for signage used as part of a construction/real estate project. The trained ML model 106*b* may receive this first data category and may determine a predicted data category mapping indicating that the first data category corresponds (i.e., maps) to a normalized data category of "Signage-Non marketing" that may include other types of non-marketing signage beyond the permanent signage indicated by the user. This normalized data category may also include data corresponding to data categories such as "Monument Signs", "Building Signage", and/or others.

When the trained ML model 106*b* outputs the predicted data category mapping, the processors 113 may execute the nesting data module 106*c* to generate nested tables with data corresponding to the predicted data category mapping. The nesting data module 106*c* may input data from a first data category into a first table with a first file size and collapse the first table with a second table that includes a second data category that is related to the first data category to generate a nested table. In particular, the nesting data module 106*c* may collapse the two tables together such that the nested table has a third file size that is less than a combination of the first file size and the second file size. Accordingly, the nesting data module 106*c* may reduce the overall storage capacity requirements for any project by collapsing data tables that have similar data (e.g., based on the predicted data category mapping) into a nested table with a smaller overall storage/file size.

Continuing the prior example, the nesting data module 106*c* may receive the first data category and the predicted data category mapping, and may input the first data category (e.g., any data associated with the first data category) into a first table having a first file size of 5 MB. The nesting data module 106*c* may then cause the processors 113 to collapse the first table with a second table that includes a second data category that is related to the first data category to generate a nested table. The first data category may be "Permanent Signage", the second data category may be "Building Signage", and the nested table may correspond to a normalized data category of "Signage-Non marketing". The second data table may have a second file size of 5 MB. However, as a result of the nesting performed as part of the nesting data module 106*c*, the nested table may have a third file size of 8 MB, which is less than a combination of the first file size (5 MB) and the second file size (5 MB) (e.g., a total, non-nested file size of 10 MB).

It should be appreciated that the nesting data module 106*c* may collapse any suitable number of data tables together (e.g., three or more), and that the above example is for the purposes of discussion only. Thus, the nesting data module 106*c* may significantly reduce the number of data tables required to store the relevant data for a particular project. Further, the nesting data module 106*c* enables more flexible data access patterns and saves computational resources when accessing and manipulating the nested data tables. Moreover, the nesting data module 106*c* may utilize any suitable protocol or structure, such as a PostgreSQL LTREE data module, to create and/or access the nested tables.

In certain embodiments, the nesting data module 106*c* may also include instructions configured to cause a processor (e.g., processors 108, 113) to render a project GUI that includes the nested table(s) for access by a user (e.g., of the user computing device 102). Further in these embodiments, the processors 108 and/or the processors 113 may receive input from the user corresponding to the project GUI, such as an interaction (e.g., click, tap, swipe, voice command, gesture, etc.) specifically associated with the nested table(s) displayed on the project GUI. Responsive to receiving this input from the user, the processors 108 and/or the processors 113 may execute the nesting data module to expand the nested table into, for example, a first table and a second table from which the nested table was originally created.

The processors 113 may then store the nested tables in the project database 106*g* for future access and/or updates/changes. The project database 106*g* may be stored on the host server 104 and/or may be stored in a remote location (not shown), such as the remote server 105. Generally, the remote server 105 may include a set of data categories 105*a* and a set of search index instructions 105*b*. The set of data categories 105*a* may include any suitable number of different data categories that may be relevant to any particular project, set of projects, or industry/industries. The set of data categories 105*a* may also be similar/identical to the set of data categories 106*h* that may be stored in the memory 106 of the host server 104.

The set of search index instructions 105*b* may be or include instructions configured to cause the remote server 105 to search through the set of data categories 105*a* to return probable/likely data category mappings for any input data categories. For example, the host server 104 may receive an input from a user (e.g., via user computing device 102) indicating the data category "Project Software and Applications", and the host server 104 may format an input query (e.g., via the trained ML model 106*b*) that is transmitted to the remote server 105 via the network interface controller 114. For example, the trained ML model 106*b* may be or include a large language model (LLM) configured to receive input data categories from a user, semantically/syntactically analyze the input data categories, and format an input query for transmission to the remote server 105 to query the set of data categories 105*a*.

Upon receipt of the input query, the set of search index instructions 105*b* may cause the remote server 105 to search the set of data categories 105*a* for normalized data categories that may correspond to the "Project Software and Applications" data category provided by the user. The set of search index instructions 105*b* may cause the remote server 105 to return a listing of normalized data categories that may correspond to the "Project Software and Applications" data category, and this listing may provide a ranking of each normalized data category and/or an indication of a confidence value/score for each normalized data category included as part of the listing. The listing may include, for example, "General Administrative & Overhead" as a first potential normalized category with a 95% confidence level/value, "Marketing" as a second potential normalized category with a 50% confidence level/value, and "Legal Services" as a third potential normalized category with a 15% confidence level/value.

The remote server 105 may return this listing to the host server 104, where the trained ML model 106b may evaluate the listing and determine a predicted data category mapping for the first data category. Thus, in certain embodiments, the host server 104 may transmit data to a remote server 105 for processing as part of the actions described herein. More specifically, in some embodiments, the remote server 105 may be or be part of a cloud processing architecture, and the host server 104 may transmit input queries including data categories and/or other data for processing by the cloud processing architecture, of which the remote server 105 is a part. However, in certain aspects, the remote server 105 may be part of the host server 104 and/or the user computing device 102.

In any event, when the data category mapping and table nesting is performed, these values may be stored and updated/changed in real-time based on a variety of different inputs. For example, the trained ML model 106b may receive additional data categories from a user, generate predicted data category mappings for those additional data categories, and the nesting data module 106c may include the data from those additional data categories in nested tables with data categories previously analyzed by the trained ML model 106b and nesting data module 106c. Additionally, the external input analysis model 106d, the draw request model 106e, and/or the retainage model 106f may update/change these values in real-time.

The external input analysis model 106d may generally analyze external data from external sources (not shown) connected to the host server 104, and may determine predicted classifications and impacts to the project based on this external data. These external sources may generally be collected at the data inbox 106i where some/all documents and transactions may be sent to undergo any reviews and/or approval workflows before being accepted into a project. This data inbox 106i may have separate inboxes for different transaction types, such that the external input analysis model 106d may classify different types of transactions and do separate analysis of those transaction types.

More specifically, the external input analysis model 106d may automatically extract data (i.e., "external data") from a document and/or other file that is sent to the data inbox 106i so that users of the host server 104 do not perform any data entry. Once the external input analysis model 106d extracts the data, the model 106d may flag any potential issues that the external data may pose with the data already stored in the project database and/or otherwise associated with the project. The external input analysis model 106d may output a predicted classification which may indicate a particular data category, normalized data category, line item, and/or other data stored as part of the project (e.g., in the project database) to which the external data applies, and may output a predicted impact of the external data. The predicted impact may summarize how the external data may affect the portion of the project indicated by the predicted classification and may flag and/or otherwise indicate these potential issues with a predicted solution to help resolve the potential issues before the external data is accepted/stored as part of the project.

For example, the data inbox 106i connected to the external input analysis model 106d may receive an email message containing a document outlining a set of costs associated with a project. The external input analysis model 106d may analyze the document, extract the set of costs, compare those costs with the anticipated costs stored in the project database 106g, and may output the predicted classification and impact highlighting to a user what the document indicates and why it may be impactful to the project. The external input analysis model 106d may also take this cost data from the document, automatically generate a second document that includes the cost data in a standardized format/schema, and store this standardized second document in the project database 106g and/or a relational database (not shown) stored therein. Thus, the external input analysis model 106d may take data from the data inbox 106i that is formatted in any manner the transmitting entity chooses and may normalize that data in the project database 106g to present a uniform experience for users (e.g., project managers, etc.) accessing the host server 104 to manage any number of projects and/or vendors.

Further, the host server 104 may determine a classification of the external input based on the predicted classification and update an entry of a data category within the nested table based on the classification. Additionally, or alternatively, the host server 104 may adjust an estimated value within the nested table based on the predicted impact. In certain embodiments, the external data may be stored in non-nested tables (e.g., within project database 106g) that reference the nested tables output by the nesting data module 106c. Adjusting the estimated values may be or include, for example, adjusting a total required budget for a project, shifting a timeline to accommodate a updated expense timing, and/or any other suitable adjustments to any suitable values stored in a nested/non-nested table in the project database 106g and/or otherwise associated with the project.

The draw request model 106e may analyze external inputs from external sources (not shown) connected to the host server 104, extract request data from these external inputs, identify whether this request data conforms to a set of consolidation rules, and/or generate a draw request formatted based on the set of consolidation rules. Generally speaking, draw requests are critical reports used to request funds from various sources during requisition periods. Historically, these draw requests are compiled in spreadsheet software (e.g., Microsoft Excel®), requiring significant amounts of time from users associated with the project. To alleviate these and other issues, the draw request model 106e enables users to generate draw request packages automatically with a single interaction (e.g., click, tap, swipe, voice command, gesture, etc.) that are customized in accordance with any suitable parameters/options that are saved to the project database 106g for reference throughout the length of the project.

More specifically, the draw request model 106e may generate draw requests based on, for example, external data extracted from the data inbox 106i. The draw request model 106O may reference and/or otherwise implement a set of consolidation rules that determine, inter alia, orderings of backup documents and rules to resolve conflicts between/among draw requests. Specifically, the draw request model 106e may leverage the set of consolidation rules to resolve draw conflicts and/or other information that is flagged as a potential issue when generating a draw request in response to external data extracted from, for example, a communication/document received through the data inbox 106i. In certain embodiments, the draw request model 106e may work in tandem with the external input analysis model 106d to extract external data from data inbox 106i documents/messages and subsequently generate a draw request based on the extracted external data.

As mentioned, the draw request model 106e may also automatically generate various reports based on the external data extracted from the data inbox 106i. The draw request model 106e may analyze the external data and recognize that the external data includes and/or otherwise corresponds to request data (e.g., indicates/references a draw request), and may evaluate the request data in accordance with each of the set of consolidation rules to ensure that the request data satisfies each consolidation rule. If the draw request model 106e determines that the request data fails to satisfy any consolidation rule, the model 106e may generate a recommended action to resolve this conflict. However, if the draw request model 106c determines that the request data satisfies all consolidation rules, the model 106c may automatically generate a draw request that includes the request data. This draw request may generally be a document formatted as a report with some/all of the request data and/or any other suitable data stored in the project database 106g and/or otherwise associated with the project.

The draw request model 106e may then upload and/or otherwise finalize the draw request for transmission to a receiving entity (e.g., financial institution). In certain embodiments, upon generation of the draw request, the draw request model 106e may automatically request approval from a set of approving users before uploading/finalizing the draw request. The draw request model 106c may wait until all approving users have approved the draw request, at which point, the draw request model 106c may proceed with uploading/finalizing the draw request. Moreover, in some embodiments, the external inputs may be in a variety of different formats when analyzed in accordance with the draw request model 106e and/or external input analysis model 106d. In these embodiments, the draw request model 106e may convert the external inputs from the variety of different formats to a normalized format, thereby ensuring draw requests created by the draw request model 106e are standardized to create more accessible and readily understandable data included as part of each draw request.

The retainage model 106f may analyze data from the project database 106g and/or from any other suitable source (s) to predict a retainage value corresponding to the project. Generally speaking, retainage is the withholding of a portion of final payment on a project for a defined period to ensure a contractor or subcontractor has finished a construction project completely and correctly. Historically, tracking this retainage value is a complicated and error-prone task involving substantial amounts of manual intervention and review from users associated with the project. The retainage model 106f alleviates these concerns by actively predicting/updating the retainage value over time as new requisition periods are created for the project, e.g., in the project database 106g.

Specifically, the retainage model 106f may predict a retainage value based on data included in the nested table, such as total project budget, amounts already paid, total anticipated remaining cost, etc. The processors 108 and/or the processors 113 may receive updated data to be stored in the nested table, and the retainage model 106f may generate, using the updated data as inputs, an updated retainage value. The retainage model 106f may further include instructions that cause a user computing device (e.g., user computing device 102) to display the updated retainage value to a user.

Additionally, or alternatively, the retainage model 106f may generate estimated project completion values based on data from the project database 106g and/or from any other suitable source(s). This estimated project completion value is generally associated with a pencil requisition process, whereby an owner/developer may engage in back-and-forth discussions with contractors/subcontractors regarding percentages of work that were completed in a given period of the project. Similar to tracking the retainage value, this pencil requisition process is typically a long, manual process that consumes significant amounts of user time. The retainage model 106f may alleviate these concerns as well by actively generating project completion values and managing the back-and-forth pencil requisition process on behalf of the users associated with the project. Further, the retainage model 106f may automate gathering/interpreting user comments and user approvals, communicating changes to project completion values and corresponding documents, and updating data in the project database 106g corresponding with the pencil requisition process.

In particular, the retainage model 106f may generate an estimated project completion value based on data included in a nested table (e.g., stored in the project database 106g). The retainage model 106f may then cause the processors 108 and/or the processors 113 to transmit the estimated project completion value to an external computing device (e.g., user computing device 102, host server 104, remote server 105). In certain embodiments, the external computing device may be another device not shown in FIG. 1 that is connected to and/or otherwise has access to the network 120 to transmit data to one or more of the user computing device 102, the host server 104, and/or the remote server 105. In any event, the processors 108 and/or the processors 113 may then receive, from the external computing device, an adjusted project completion value. The retainage model 106f may determine an updated project completion value based on the estimated project completion value and the adjusted project completion value.

In some embodiments, the retainage model 106f may also include instructions configured to cause the processors 108 and/or the processors 113 to transmit the adjusted project completion value to the external computing device, and to iteratively perform this series of actions until the updated project completion value received from the external computing device is identical to the adjusted project completion value transmitted to the external computing device and/or any other form of acceptance is provided. For example, the retainage model 106f may calculate a first project completion value (e.g., $10,000), and that first project completion value may be transmitted to the external computing device. The external computing device may transmit a second project completion value (e.g., $20,000) that differs from the first project completion value, and the retainage model 106f may update the project completion value to the second value (i.e., accept the second value), retransmit the first project completion value to the external computing device, or update/transmit a third project completion value (e.g., $15,000).

Regardless, if the external computing device transmits an updated project completion value that matches the value sent by the retainage model 106f, then the model 106f may finalize the project completion value and save the final project completion value to the project database 106g and/or generate an agreement for execution by the entities that are part of the pencil requisition process mediated by the model 106f. The retainage model 106f may also record and/or otherwise store the executed agreement in the project database 106g once all relevant entities have executed the agreement.

In certain embodiments, the memories 110, 106 may store instructions that cause the processors 108 and/or the processors 113 to render a project projection GUI configured to display data stored within the nested table(s) stored as part of the project database 106g. For example, the project application 112 stored in the memory 110 of the user computing device 102 may include instructions to render the project projection GUI in response to receiving nested table(s) and/or other data from the project database 106g. These instructions may further cause the processors 108 and/or the processors 113 to receive updated project data and determine that the updated project data violates a threshold value corresponding to a respective data category represented in the project projection GUI. In this circumstance, the instructions may cause the processors 108 and/or the processors 113 to adjust a graphical display element of the project projection GUI corresponding to the respective data category based on the updated project data violating the threshold value.

In other words, the memories 110, 106 may store instructions that cause the processors 108 and/or the processors 113 to proactively manage certain portions of the project based on high-level and/or granular-level perspectives of certain data corresponding to the project (e.g., costs, variance, etc.). As an example, the memories 110, 106 may store instructions that cause the processors 108 and/or the processors 113 to evaluate a contingency remaining value that corresponds to a sum of all contingency data (e.g., funds set aside to account for unknown costs) included as part of the project. In the event that the processors 108 and/or the processors 113 determine that the contingency remaining value fails to satisfy the contingency threshold value (e.g., is less than the threshold value), then the processors 108 and/or the processors 113 may adjust a graphical display element corresponding to the contingency remaining value. In practice, the graphical display element may be a color, a graphical overlay, a patterning, and/or any other suitable graphical element. Further, the processors 108 and/or the processors 113 may adjust this graphical display element by adjusting a visual aspect (e.g., the color, patterning, graphical overlay) of the graphical display element to emphasize/highlight the fact that the contingency remaining value has failed to satisfy the contingency remaining threshold.

In some embodiments, the instructions may cause the processors 108 and/or the processors 113 to generate a pop-up and/or other interactive box or menu on or over the project projection GUI indicating that the updated project data violates a threshold value corresponding to a respective data category represented in the project projection GUI. Moreover, in certain embodiments, the instructions stored on the memories 110, 106 may cause the processors 108 and/or the processors 113 to generate and/or automatically update anticipated cost report(s) with recent data categories and/or associated data, calculate various values associated with the project (e.g., remaining budget, exposures, etc.), and graphically indicate excess and/or deficient remaining budgets via the project projection GUI.

More broadly, each of the modules stored in memory 106 implement specific functionality in order to optimize project data storage. For example, the ML module 106a includes computer-executable instructions for training and operating one or more ML model. In general, the ML module 106a may train one or more ML models (e.g., ML model 106b) by establishing a network architecture, or topology, and adding layers that may be associated with one or more activation functions (e.g., a rectified linear unit, softmax, etc.), loss functions and/or optimization functions. As an example, one or more types of artificial neural networks may be employed, including without limitation, recurrent neural networks, convolutional neural networks, and/or deep learning neural networks. Data sets used to train the artificial neural network (s) may be divided into training, validation, and testing subsets, and these subsets may be encoded in an N-dimensional tensor, array, matrix, or other suitable data structures. Training may be performed by iteratively training the network using labeled training samples.

Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values. In embodiments, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In embodiments, multiple artificial neural networks may be separately trained and operated, and/or separately trained and operated in conjunction. In certain embodiments, a Bayesian model may be used to train the ML model 106b.

In some embodiments, the one or more ML models may include an artificial neural network having an input layer, one or more hidden layers, and an output layer. Each of the layers in the artificial neural network may include an arbitrary number of neurons. The plurality of layers may chain neurons together linearly and may pass output from one neuron to the next or may be networked together such that the neurons communicate input and output in a non-linear way. In general, it should be understood that many configurations and/or connections of artificial neural networks are possible. For example, the input layer may correspond to input parameters that are given as full sentences, or that are separated according to word or character (e.g., fixed width) limits. The input layer may correspond to a large number of input parameters (e.g., one million inputs), in some embodiments, and may be analyzed serially or in parallel. Further, various neurons and/or neuron connections within the artificial neural network may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction. In some embodiments and/or scenarios, the output layer includes only a single output.

Further, in certain embodiments, the ML module 106a may train the ML model 106b to employ supervised learning, which involves identifying patterns in existing data to make predictions about subsequently received data. Specifically, the ML model 106b may be "trained" using training data, which includes example inputs and associated example outputs. Based upon the training data, the ML model 106b may generate a predictive function which maps outputs to inputs and may utilize the predictive function to generate machine learning outputs based upon data inputs. The exemplary inputs and exemplary outputs of the training data may include any of the data inputs or machine learning outputs described above. In the exemplary embodiment, a processing element may be trained by providing it with a large sample of data with known characteristics or features.

In another embodiment, the ML module 106a may train the ML model 106b to employ unsupervised learning, which involves finding meaningful relationships in unorganized data. Unlike supervised learning, unsupervised learning does not involve user-initiated training based upon example inputs with associated outputs. Rather, in unsupervised learning, the ML model 106b may organize unlabeled data according to a relationship determined by at least one machine learning method/algorithm employed by the ML model 106b. Unorganized data may include any combination of data inputs and/or machine learning outputs as described above.

In yet another embodiment, the ML module 106a may train the ML model 106b to employ reinforcement learning, which involves optimizing outputs based upon feedback from a reward signal. Specifically, the ML model 106b may receive a user-defined reward signal definition, receive a data input, utilize a decision-making model to generate a machine learning output based upon the data input, receive a reward signal based upon the reward signal definition and the machine learning output, and alter the decision-making model so as to receive a stronger reward signal for subsequently generated machine learning outputs. Other types of machine learning may also be employed, including deep or combined learning techniques.

As an example, the ML model 106b may employ natural language processing (NLP) functions, which generally involves understanding verbal/written communications and generating responses to such communications. The ML model 106b may be trained to perform such NLP functionality using a symbolic method, machine learning models, and/or any other suitable training method. As an example, the ML model 106b may be trained to perform at least two techniques that may enable the ML model 106b to understand words spoken/written by a user: syntactic analysis and semantic analysis.

Syntactic analysis generally involves analyzing text using basic grammar rules to identify overall sentence structure, how specific words within sentences are organized, and how the words within sentences are related to one another. Syntactic analysis may include one or more sub-tasks, such as tokenization, part of speech (POS) tagging, parsing, lemmatization and stemming, stop-word removal, and/or any other suitable sub-task or combinations thereof. For example, using syntactic analysis, the ML model 106b may generate textual transcriptions from verbal responses from a user in a data stream.

Semantic analysis generally involves analyzing text in order to understand and/or otherwise capture the meaning of the text. In particular, the ML model 106b applying semantic analysis may study the meaning of each individual word contained in a textual transcription in a process known as lexical semantics. Using these individual meanings, the ML model 106b may then examine various combinations of words included in the sentences of the textual transcription to determine one or more contextual meanings of the words. Semantic analysis may include one or more sub-tasks, such as word sense disambiguation, relationship extraction, sentiment analysis, and/or any other suitable sub-tasks or combinations thereof. For example, using semantic analysis, the ML model 106b may generate one or more intent interpretations based upon one or more textual transcriptions from a syntactic analysis.

In some embodiments, the ML module 106a may train the ML model 106b as a generative AI model (also referenced as generative ML models). Data input into such a generative AI/ML model may include data categories, data category mappings, normalized data categories, and other data. The data input into the generative AI/ML model may include text, documents, and images, such as text, documents and images related to project data, data categories, normalized data categories, data category mappings, and other data. In certain embodiments, a generative AI/ML model may be or include a ChatGPT model. The generative AI/ML model may also employ supervised or unsupervised machine learning techniques, which may be followed by, and/or used in conjunction with, reinforced or reinforcement learning techniques. The generative AI/ML model may also generate audible or verbal output, text or textual output, visual or graphical output, output for use with speakers and/or display screens, and/or other types of output for user and/or other computer or bot consumption.

After training, ML programs (or information generated by such ML programs) may be used to evaluate additional data. Such data may be and/or may be related to data categories and/or other project data that was not included in the training dataset. The trained ML programs (or programs utilizing models, parameters, or other data produced through the training process) may accordingly be used for determining, assessing, analyzing, predicting, estimating, evaluating, or otherwise processing new data not included in the training dataset. Such trained ML programs may, therefore, be used to perform part or all of the analytical functions of the methods described elsewhere herein.

It is to be understood that supervised ML and/or unsupervised ML may also comprise retraining, relearning, or otherwise updating models with new, or different, information, which may include information received, ingested, generated, or otherwise used over time. Further, it should be appreciated that, as previously mentioned, the ML model 106b may be used to output a predicted data category mapping and/or any other values, responses, or combinations thereof using artificial intelligence or, in alternative aspects, without using artificial intelligence.

Moreover, although the methods described elsewhere herein may not directly mention ML techniques, such methods may be read to include such ML for any determination or processing of data that may be accomplished using such techniques. For example, any of the ML model 106b, the nesting data module 106c, the external input analysis model 106d, the draw request model 106e, the retainage model 106f, and/or any other models, modules, and/or other software described herein may be trained to use, and may actively employ, any of the ML techniques described herein. In some aspects, such ML techniques may be implemented automatically upon occurrence of certain events or upon certain conditions being met. In any event, use of ML techniques, as described herein, may begin with training a ML program, or such techniques may begin with a previously trained ML program.

Generally speaking, each of the user computing device 102, the host server 104, and/or the remote server 105 may be individual computing devices, a group of multiple computing devices, an individual server, a group (e.g., cluster) of multiple servers, and/or another suitable type of computing device or system (e.g., a collection of computing resources). In some aspects, one or more components of the user computing device 102, the host server 104, and/or the remote server 105 may be embodied by one or more virtual instances (e.g., a cloud-based virtualization service). In such cases, the one or more user computing devices 102, the one or more host servers 104, and/or the one or more remote servers 105 may be included in a remote data center (e.g., a cloud computing environment, a public cloud, a private cloud, etc.).

However, regardless of the specific implementation of the user computing device 102, the host server 104, and/or the remote server 105, a user may utilize the user computing device 102 to access the host server 104 and/or the remote server 105 in order to access the data stored therein (e.g., 105*a*-*b*, 106*a*-*i*). In this manner, the user computing device 102 may retrieve and/or otherwise access the data required to optimize project data storage.

In any event, as previously mentioned, the user computing device 102 and the host server 104 include processors 108, 113 and network interface controllers 109, 114. The processors 108, 113 may include any suitable number of processors and/or processor types, such as CPUs and one or more graphics processing units (GPUs). Generally, the processors 108, 113 are configured to execute software instructions stored in the memories 110, 106, such as the project application 112, the ML module 106*a*, the ML model 106*b*, the nesting data module 106*c*, the external input analysis model 106*d*, the draw request model 106*e*, and the retainage model 106*f*, and/or other instructions. More generally, the processors 108, 113 may be connected to the memories 110, 106 via a computer bus responsible for transmitting electronic data, data packets, or otherwise electronic signals to and from the processors 108, 113 and the memories 110, 106 in order to implement or perform the machine readable instructions, methods, processes, elements or limitations, as illustrated, depicted, or described for the various flowcharts, illustrations, diagrams, figures, and/or other disclosure herein.

The processors 108, 113 may interface with the memories 110, 106 via the computer bus to execute an operating system (OS). The processors 108, 113 may also interface with the memories 110, 106 via the computer bus to create, read, update, delete, or otherwise access or interact with the data stored in the memories 110, 106. The data stored in the memories 110, 106 may include all or part of any of the data or information described herein, and/or any other data stored in the memories 110, 106.

The memories 110, 106 may include one or more persistent memories (e.g., a hard drive/solid state memory) and may store one or more set of computer executable instructions/modules. In general, a computer program or computer based product, application, or code (e.g., the ML module 106*a* and other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processors 108, 113 (e.g., working in connection with the data in the memories 110, 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The memories 110, 106 may include one or more forms of non-transitory, volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In certain aspects, the memories 110, 106 may store an operating system (OS) (e.g., Microsoft Windows, Linux, Unix, etc.) capable of facilitating the functionalities, applications, methods, or other software as discussed herein.

The memories 110, 106 may also store any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, or otherwise be part of the various applications/modules/models described herein, where each may be configured to facilitate their various functionalities discussed herein. It should be appreciated that one or more other applications may be envisioned and that are executed by the processors 108, 113.

The network interface controllers 109, 114 may include any suitable network interface controller(s), such as wired/wireless controllers (e.g., Ethernet controllers), and facilitate bidirectional/multiplexed networking over the network 120 between the user computing device 102 and other components of the environment 100 (e.g., host server 104, the remote server 105, etc.). The network 120 may be a single communication network or may include multiple communication networks of one or more types (e.g., one or more wired and/or wireless local area networks (LANs), and/or one or more wired and/or wireless wide area networks (WANs) such as the Internet). The network 120 may enable bidirectional communication between the host server 104, the user computing device 102, the remote server 105, and/or between multiple user computing devices 102, for example. According to some embodiments, the user computing device 102, the host server 104, and/or the remote server 105 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a computer network.

In some embodiments, the user computing device 102, the host server 104, and/or the remote server 105 may include a client-server platform technology such as ASP.NET, Java J2EE, Ruby on Rails, Node.js, a web service or online API, responsive for receiving and responding to electronic requests. The user computing device 102, the host server 104, and/or the remote server 105 may implement the client-server platform technology that may interact, via the computer bus, with the memories 110, 106 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

The user computing device 102, the host server 104, and/or the remote server 105 may further include or implement an operator interface configured to present information to an administrator or operator and/or receive inputs from the administrator or operator. For example, an operator interface may provide a display screen (e.g., via input device 107*a* or output device 107*b*). The user computing device 102, the host server 104, and/or the remote server 105 may also provide I/O components (e.g., ports, capacitive or resistive touch sensitive input panels, keys, buttons, lights, LEDs), which may be directly accessible via or attached to the user computing device 102, the host server 104, and/or the remote server 105 or may be indirectly accessible via or attached to an internal user computing device. According to some embodiments, an administrator or operator may access the host server 104 and/or the remote server 105 by the user computing device 102 to review information (e.g., project data updates, data category predictions, etc.), make changes, input data categories, and/or perform other functions.

As described above herein, in some embodiments, the user computing device 102, the host server 104, and/or the remote server 105 may perform the functionalities as discussed herein as part of a "cloud" network or may otherwise communicate with other hardware or software components within the cloud to send, retrieve, or otherwise analyze data or information described herein.

Figure 2A:
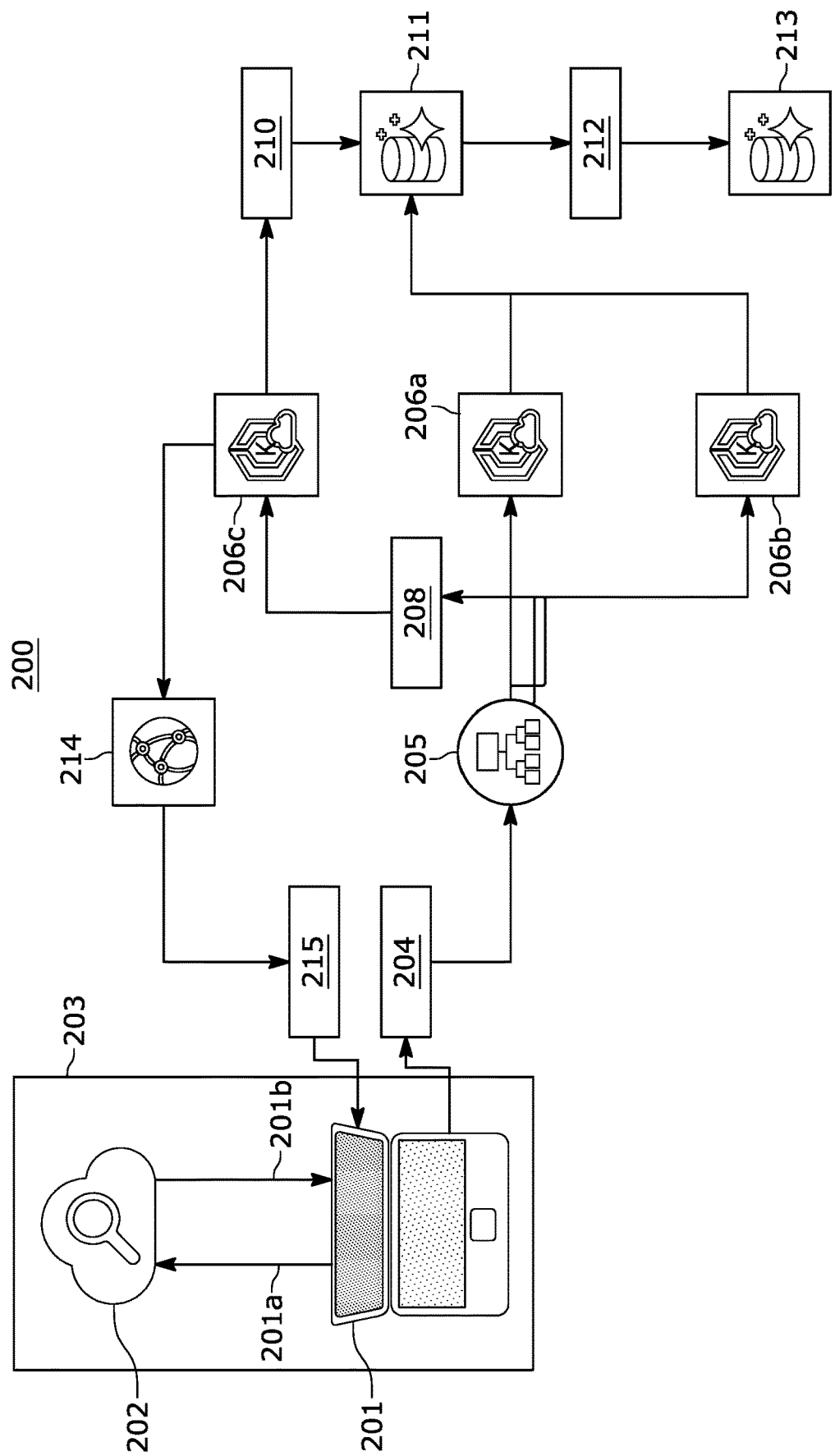
FIG. 2A illustrates an example project creation sequence utilizing a portion of the example computing environment of FIG. 1, in accordance with various embodiments described herein.

FIG. 2A illustrates an example project creation sequence 200 utilizing a portion of the example computing environment 100 of FIG. 1, in accordance with various embodiments described herein. Generally, the example project creation sequence 200 includes a user device 201, a smart search index 202, a network traffic load balancer 205, a cloud computing resource 206a-c, a cloud database 211, a cloud database replica 213, and a project application storage location 215.

As previously discussed, the techniques of the present disclosure offer users the flexibility to categorize their project data in any suitable manner while also providing standardization of global/system data categories (e.g., hundreds/thousands of normalized data categories) to normalize data across projects/industries without hamstringing users from structuring projects in an optimal manner for their specific purpose(s). These advantages are illustrated by the example project creation sequence 200 of FIG. 2A, as the user device 201 initiates communications with the smart search index 202 through an application (e.g., project application 112) by transmitting a search request for a data category corresponding to the user input data category (block 201a). The smart search index 202 may then return a list or set of predicted data category mappings for the user input data category (block 201b).

Thus, through the project creation sequence 200, users may create new projects using any suitable naming conventions they choose, and the various components illustrated in FIG. 2A and components described elsewhere herein may perform the remaining functions necessary to provide normalized data categories that enable insight generation across projects and industries. For example, a user utilizing the user device 201 has the flexibility to pick which categorization schema they want to see their data arranged by, and the smart search index 202 (e.g., leveraging trained ML model 106b) may analyze a dataset of hundreds/thousands of normalized budget lines to determine how the user's custom input data categories map back to the global standard set of data categories.

More specifically, the smart search index 202 may include a transformer and ML model (e.g., trained ML model 106b) generating three predicted data category mappings that each match to a global data category with individual confidence intervals/levels. As part of this interaction between the user device 201 and the smart search index 202, the user may engage in a feedback loop with the smart search index 202 by providing validation for the machine proposed data category mapping(s), and the smart search index 202 may flag any adjustments made by the user to the predicted data category mapping(s). In this manner, the user input and adjustments may refine the overall model utilized by the smart search index 202.

As mentioned, this automatic generation of predicted data category mappings may provide various advantages, including the ability to generate valuable insights from the normalized data categories applied to non-normalized data inputs. For example, the normalized data categories enable benchmarking for any data included as part of a project (e.g., project costs, vendor costs across different scopes of work, comparison between accounts, projects, asset classes, geo-locations), allows users to automatically copy projects and their categorization schemas. Further, the normalization provides users with the ability to understand vendors that are associated with the normalized data categories, as well as the ability to categorize data scraped from documents that are associated with unique data categories (i.e., architecture contracts versus engineering contracts). This interaction with the smart search index 202, generally referenced as block 203, is described further in reference to FIGS. 2B and 2C and elsewhere herein.

In any event, after the user device 201 receives the list or set of predicted data category mappings, a user of the user device 201 may finalize the project with one or more data categories/subcategories. At block 204, the user device 201 may then save and/or otherwise transmit the finalized project to the traffic load balancer 205. The traffic load balancer 205 may forward this finalized project to the cloud computing resource 206a-c.

As illustrated in FIG. 2A, the cloud computing resource 206a-c may include multiple instances of the computing resource. Namely, the cloud computing resource 206a-c may include a first cloud computing resource 206a, a second cloud computing resource 206b, and a third cloud computing resource 206c. Each of these instances of the cloud computing resource 206a-c may be a replicated version of any one of the cloud computing resource 206a-c, for example, to provide redundant computing resources. The traffic load balancer 205 may transmit the finalized project to one or more of the cloud computing resources 206a-c, and one or more of the resources 206a-c may format the project data and save/transmit the formatted project data to the cloud database 211 for storage.

The cloud computing resources 206a-c may format the finalized project data by converting the data into a "tree" structure for storage in the cloud database 211. Such a tree structure may be similar to and/or otherwise include the nested tables referenced herein and may enable users to access and view various categories/subcategories of project data by expanding and collapsing branches of the tree. Regardless, the cloud database 211 may receive the formatted project data from the cloud computing resources 206a-c, and may store the formatted project data. The cloud database 211 may also duplicate the formatted project data for storage/transmission (block 212) to the cloud database replica 213.

With this finalized and formatted project data stored in the cloud database 211 and/or the cloud database replica 213, the user may access the data through the user device 201 via the application. Namely, the user device 201 may access the project application storage location 215 to load/access (block 216) their project data and/or to setup new projects using the application. In certain embodiments, the project application storage location 215 may be or include a website, through which, the user device 201 may access the application (e.g., project application 112).

Figure 2B:
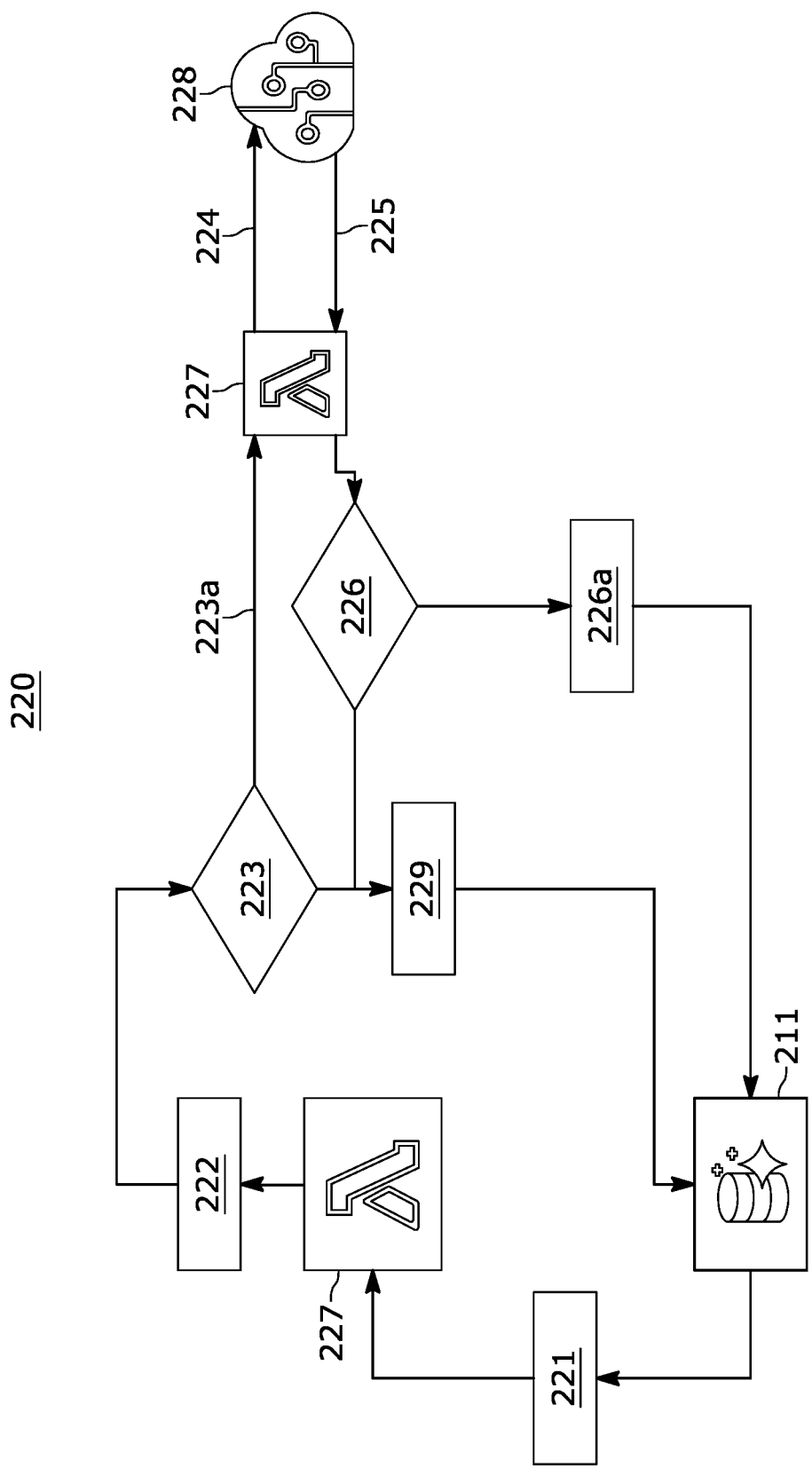
FIG. 2B illustrates an example data category prediction sequence, in accordance with various embodiments described herein.

FIG. 2B illustrates an example data category prediction sequence 220, in accordance with various embodiments described herein. Generally, the example data category prediction sequence 220 illustrates how the components described herein (e.g., host server 104, user computing device 102, remote server 105, etc.) are able to flag and correct any data categories that are not represented by the best match for a normalized data category. Data categories are typically shown in the user frontend using the user's custom naming convention(s), and there may be instances where users have a selected normalized data category that is not an optimal fit, as it does not affect their primary reporting needs. It is important that the normalized data category is an optimal representation of the input data to ensure that the resulting analytics are meaningful. For example, it is highly valuable information to know how much a certain data category costs across an industry. If a normalized data category is selected that is a bad fit for the data represented by the user's custom naming convention(s), then the resulting data used to formulate analytics will be skewed and may ultimately de-legitimize any corresponding insights drawn from such data.

To avoid these issues, the example data category prediction sequence 220 utilizes an AI model 228 to analyze some/all existing project data to flag any normalized data categories that are a bad match to their data category. These flagged normalized data categories may be flagged visually (e.g., marked in red on a display to users) to users to cue them that there are data category issues to be resolved. Any resulting adjustments to the normalized data categories may be used to update the AI model 228 accordingly.

More specifically, the example data category prediction sequence 220 includes the cloud database 211, a cloud computing service 227, and the AI model 228. Initially, the cloud computing service 227 may pull any/all new user-input data categories (block 221) and analyze these data categories to normalize them (block 222). In certain embodiments, and as part of this initial normalization, the cloud computing service 227 may remove any/all leading/trailing non-alpha characters from the user-input data categories.

The cloud computing service 227 may then evaluate whether each initial normalized data category matches the input data category and the data referenced by such data category (block 223). For example, the cloud computing service 227 may evaluate whether the confidence interval/level corresponding to the initial normalized data category satisfies the categorization threshold. If the initial normalized data category does match the relevant category and data, then the cloud computing service 227 may (at block 229) transmit/store the initial normalized data category in the cloud database 211 as part of the project, and this initial normalized data category may be used to further train/refine the AI model 228.

If the initial normalized data category does not match the relevant category and data, then the cloud computing service 227 may (at block 223a) generate a prompt requesting normalized categorization options from the AI model 228. The cloud computing service 227 may transmit this prompt (block 224) to the AI model 228, and the AI model 228 may return one or more predicted category mappings (block 225). For example, the AI model 228 may receive the prompt from the cloud computing service 227 and may return the top eight predicted data category mappings, along with the corresponding confidence intervals/levels for each mapping.

The cloud computing service 227 may then evaluate whether the user-input data category is among the predicted data category mappings provided by the AI model 228 (block 226). If the user-input data category is among the predicted data category mappings provided by the AI model 228, then the cloud computing service 227 may (at block 229) transmit/store the initial normalized data category in the cloud database 211 as part of the project. However, if the user-input data category is not among the predicted data category mappings provided by the AI model 228, the cloud computing service 227 may (at block 226a) save the category mappings provided by the AI model 228 in the cloud database 211 as recommended data categories for review, for example, by a user.

Figure 2C:
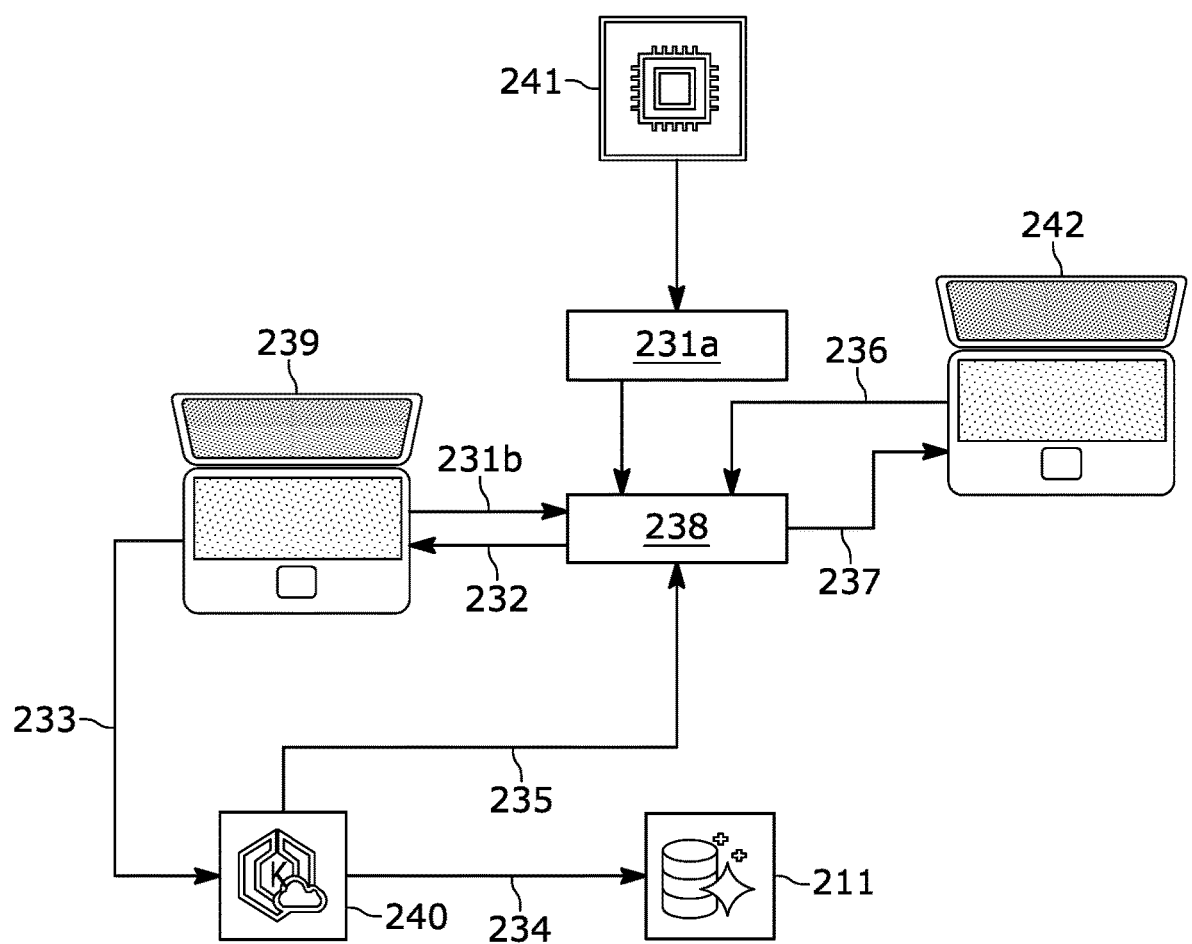
FIG. 2C illustrates an example data category prediction update sequence, in accordance with various embodiments described herein.

FIG. 2C illustrates an example data category prediction update sequence 230, in accordance with various embodiments described herein. Generally, the example data category prediction update sequence 230 illustrates how the components described herein constantly learn and improve from data categories to provide users with the best match for normalized data categories. An issue users frequently experience with conventional systems is that such systems fail to allow users to quickly set up new projects, and thereby cause users to sacrifice significant amounts of time performing tasks/actions that they previously performed in prior projects. The example data category prediction update sequence 230 alleviates these issues by provide users with a quick and seamless user experience, so that each time the user sets up a new project, the process improves and leverages data/insights from prior project set ups.

Conventional search indexes typically provide a "best match" for a keyword based on fuzzy matching of word proximities. The example data category prediction update sequence 230 utilizes a more sophisticated solution that causes the search index 238 to improve as the data stored on the cloud database 211 expands, for example, by understanding that different words can be used to describe identical data categories. Thus, the search index 238 is continually improved with user data.

For example, if a user inputs the data category "Monument Signs" for the normalized category "Signage-Non marketing", the search index 238 may learn to associate these two data categories. Accordingly, the next user that searches for "Monument Signs" would receive the suggestion "Signage-Non marketing", even though the two terms are not identical. As a consequence, this allows the search index 238 to understand all the different terms/phrases users in the any/all industries use to refer to specific normalized data categories. Moreover, the search index 238 makes it more likely that users find the most relevant data category for their data, thereby reducing the number of searches required, which saves time and reduces the amount of computational resources required of the search index 238 and associated components as well as the latency of the search service overall because each search query requires a network request to the search index 238.

In any event, the example data category prediction update sequence 230 includes the cloud database 211, a first user device 239, a cloud server 240 (e.g., host server 104, remote server 105), a cloud computing resource 241, and a second user device 242. Initially, the cloud computing resource 214 may initialize the search index 238 with a variety of normalized data categories (block 231a). A first user using the first user device 239 may search for a normalized data category from the search index 238 (block 231b). The search index 238 may return a list of best matching normalized data categories (block 232). In certain embodiments, the list of best matching normalized data categories may be ordered/ ranked, and the ordering/ranking may be based on confidence values/intervals and/or any other suitable criteria.

The first user may finalize the project, and may store the finalized project on the cloud server 240 (block 233). Upon receipt of the finalized project, the cloud server 240 may store each data category and normalized data category in the cloud database 211 (block 234). Further, the cloud server 240 may update the search index 238 with the pairs of data categories and normalized data categories (block 235).

A second user utilizing the second user device 242 may query the search index 238 for a data category mapping (block 236). The search index 238 may generate a list of recommended data category mappings (block 237), and this list may include an improved confidence interval/level associated with one or more of the normalized data categories associated with each of the recommended data category mappings. For example, if the second user includes a data category similar to one of the data categories submitted by the first user, then the resulting recommendation from the search index 238 may include recommended data category mappings for that data category with confidence intervals/levels that have been adjusted according to the feedback (e.g., acceptance, adjustment, rejection) received from the first user.

Figure 2D:
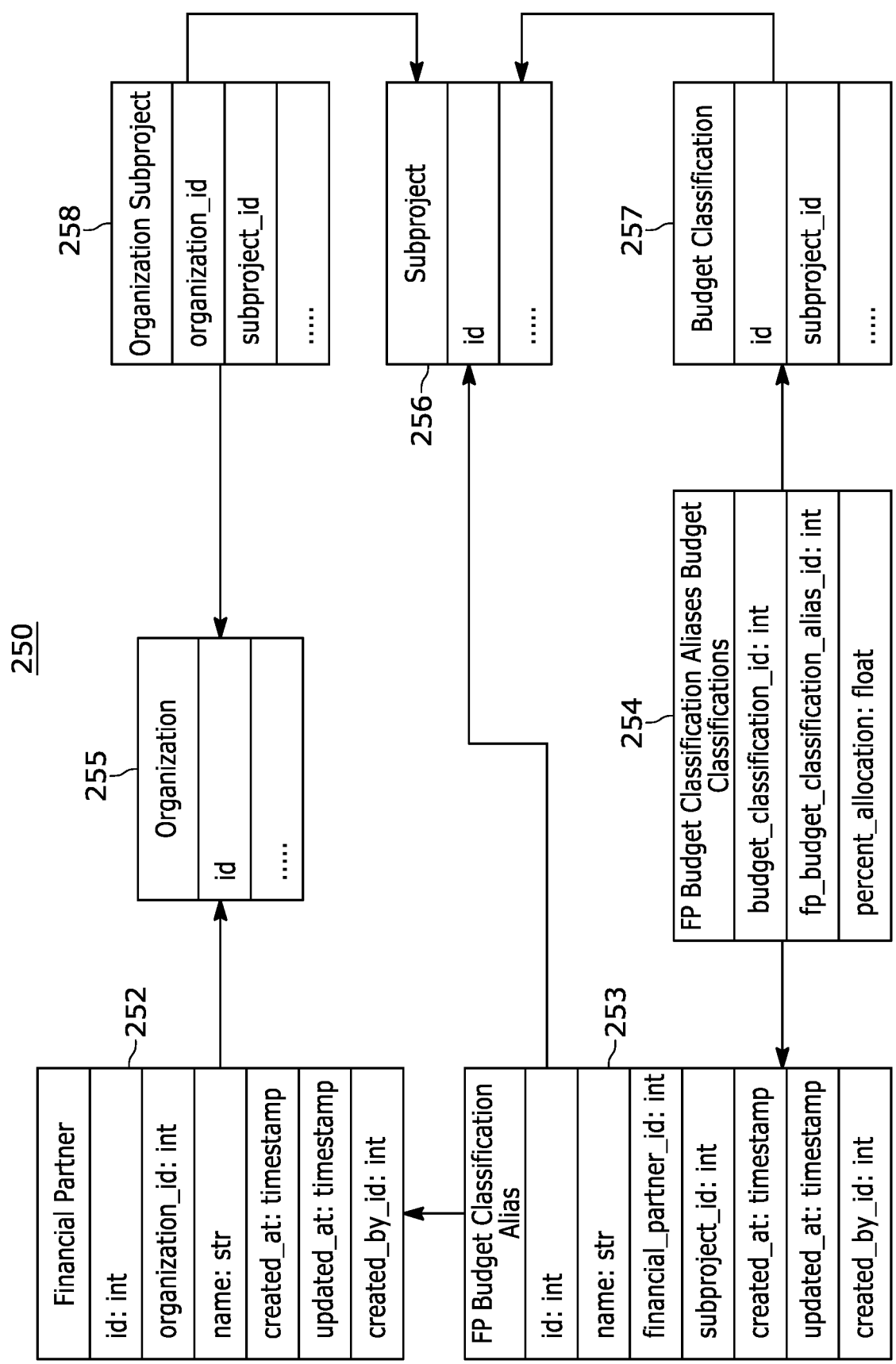
FIG. 2D illustrates an example data categorization tree, in accordance with various embodiments described herein.

FIG. 2D illustrates an example data categorization tree 250, in accordance with various embodiments described herein. The example data categorization tree 250 may be or may be included as part of the nested data tables generated by, for example, the nesting data module 106c, as described herein. Broadly, the example data categorization tree 250 may represent how users utilizing the techniques of the present disclosure may name their data categories any suitable name while still maintaining a standardized/normalized list of data categories. More specifically, the data categorization tree 250 may represent a data model for how entities/users creating project budgets may work and/or interact with various partners that may contribute to the project.

In particular, the example data categorization tree 250 includes a set of categorizations 252-254 and a set of subcategorizations 255-258 that are included in various combinations of the set of categorizations 252-254. The set of categorizations 252-254 includes a first categorization 252, a second categorization 253, and a third categorization 254. The set of subcategorizations 255-258 includes a first subcategorization 255, a second subcategorization 256, a third subcategorization 257, and a fourth subcategorization 258. As illustrated in FIG. 2D, the third subcategorization 257 may be a nested data structure storing data associated with the project, that may be nested in accordance with the various techniques described herein.

As illustrated in FIG. 2D, the first categorization 252 includes the first subcategorization 255. The second categorization 253 includes the first categorization 252 and the second subcategorization 256. The third categorization 254 includes the second categorization 253 and the third subcategorization 257. The third subcategorization 257 includes the second subcategorization 256, and the fourth subcategorization 258 includes the first subcategorization 255 and the second subcategorization 256.

As a consequence of this structure of the example data categorization tree 250, the systems described herein (e.g., host server 104) storing the tree 250 may generate multiple different formats for reports and/or analytics using the alternative data categorizations and references. In other words, the host server 104 may analyze this example data categorization tree 250 and may efficiently generate analytics/reports corresponding to the categorizations and/or any subcategorizations nested therein.

For example, the host server 104 may analyze the second categorization 253 to generate analytics and/or create formatted reports associated with the second categorization 253, and by association, the first categorization 252, the first subcategorization 255, and/or the second subcategorization 256. However, if the user determines that analytics/reports are only required for the data included as part of the first categorization 252, the host server 104 may generate analytics and/or create formatted reports associated with the first categorization 252, and by association, the first subcategorization 255. Similarly, if the user determines that analytics/reports are only required for the data included as part of the fourth subcategorization 258, the host server 104 may generate analytics and/or create formatted reports associated with the fourth subcategorization 258, and by association, the first subcategorization 255 and/or the second subcategorization 256.

Thus, the host server 104 and/or other suitable processing device(s) may analyze various sets of data in accordance with the particular structure of data categorizations the user provides. In this manner, the host server 104 and/or other suitable processing device(s) may quickly and efficiently analyze all relevant data associated with a particular data categorization/subcategorization due to the flexible architecture provided by the nested data tables and/or data categorization trees (e.g., example data categorization tree 250).

Figure 3:
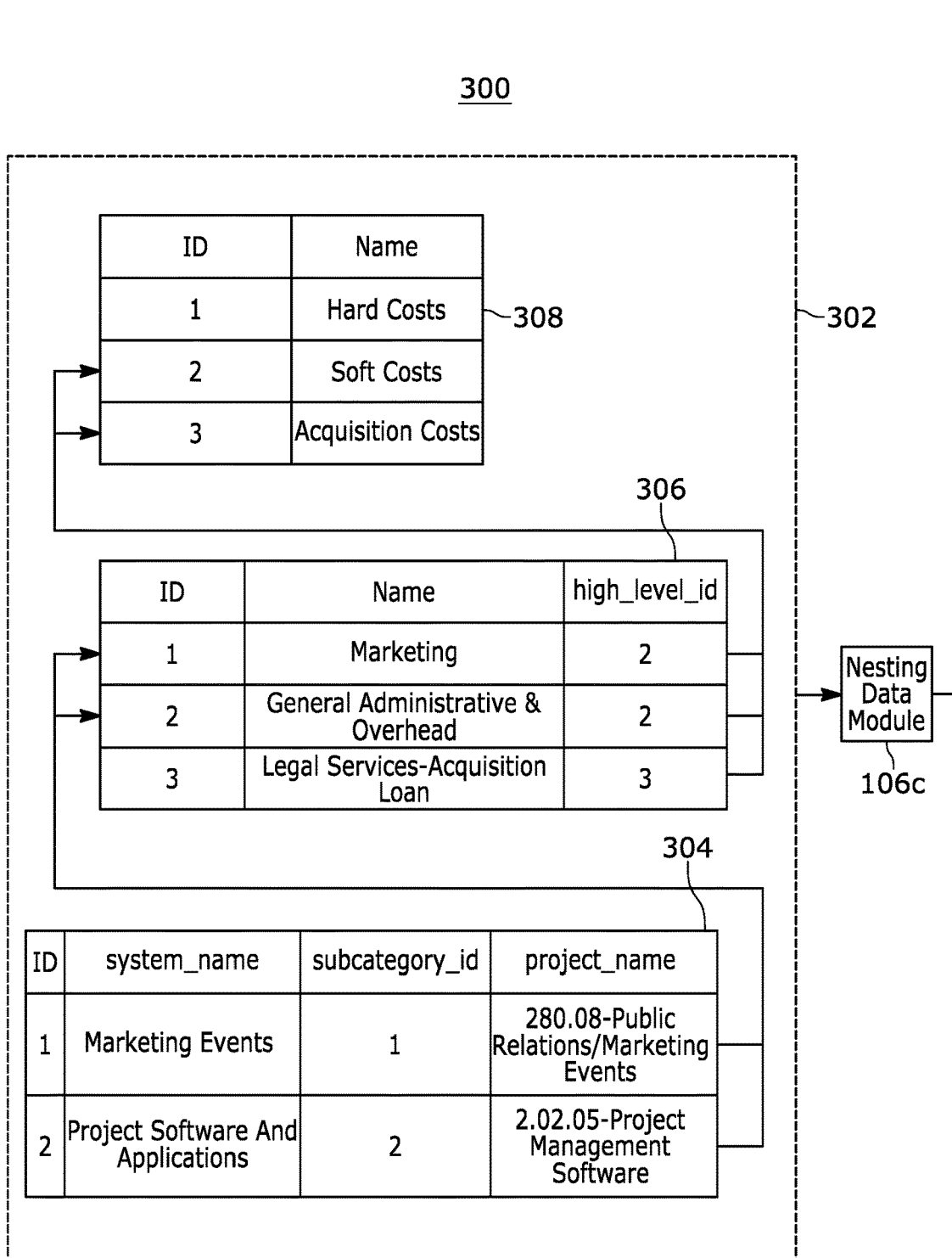
FIG. 3 illustrates an example table nesting sequence utilizing the nesting data module, in accordance with various embodiments described herein.

FIG. 3 illustrates an example table nesting sequence 300 utilizing the nesting data module 106c, in accordance with various embodiments described herein. Similar to the data categorization tree 250 of FIG. 2D, the example table nesting sequence 300 of FIG. 3 provides significant computing resource advantages, as compared to conventional techniques, at least by reducing the amount of stored data without sacrificing data granularity.

In particular, the project data and categorizations are generally hierarchical in nature, such that individual data, data subcategorizations, etc. belong to higher level data categories and those categories may belong to supercategories. Persistent storage of project data is typically required to ensure reliability and accessibility of such data, as is referential integrity to ensure that data categories/subcategories and/or data across projects may be accurately correlated. For these reasons, project data is often stored in a relational database.

A standard data model is to use a single table for each "layer" in the budget hierarchy. This standard data model may accurately store the project data but leads to storage of unnecessary database tables and limits the operations that can be performed on the data. This standard data model also imposes a restriction on a specific number of layers required/necessarily included in each project. For example, this standard data model makes it exceedingly difficult for a user to restructure a project after its creation. Moreover, the way the project data is organized in this standard data model requires several CPU cycles at least to (1) read the data from the database, (2) format the data into an appropriate data category tree structure, (3) manipulate the data, and (4) convert the data back to the format expected by the database.

However, by utilizing a native relational database tree structure, the nesting data module 106c and resulting collapsed/nested data tables allow users to have as many "layers" as they prefer in their projects and also allows them the flexibility to modify their projects to a degree that was not possible using conventional techniques (e.g., the standard data model). Further, the native relational database tree structure alleviates the excess processing demand issues caused by the conventional techniques by eliminating the requirement for additional CPU cycles to perform, for example, actions (1)-(4), as described above. In certain embodiments, the native relational database tree structure utilized by the nesting data module 106c may be or include the LTREE structure.

In any event, as illustrated in the example table nesting sequence 300, a set of data tables 302 are input into the nesting data module 106c, which outputs a nested data table 310. Each data table 304, 306, 308 included in the set of data tables 302 may include data categorizations and/or data. The first data table 304 may include a first set of subcategorizations, the second data table 306 may include a second set of subcategorizations, and the third data table 308 may include a set of categorizations.

The first set of subcategorizations in the first data table 304 may generally be related to and/or otherwise fall under one or more of the subcategorizations provided in the second set of subcategorizations of the second data table 306. Each of the second set of subcategorizations may generally be related to and/or otherwise fall under one or more of the categorizations provided in the set of categorizations of the third data table 308. Conventionally, each of these data tables 304, 306, 308 may be stored independently in a storage location. However, the techniques of the present disclosure may reduce the storage requirements necessitated by these conventional techniques, by the nesting data module 106c collapsing the data tables 304, 306, 308 into the nested data table 310.

The nested data table 310 may generally include all of the data included in each of the individual data tables 304, 306, 308, and may adjust and/or otherwise change the identification or path references of the various data categories/subcategories stored therein. In this manner, the nesting data module 106c may maintain the reference structure of the individual data tables 304, 306, 308, without requiring the storage of each of the individual data tables 304, 306, 308 themselves.

Namely, as illustrated in FIG. 3, the nesting data module 106c may adjust the identification values and subcategory identification values of the subcategorizations in the first data table 304 from 1 and 2 to 7, 8, 2.4.7, and 2.5.8 within the nested data table 310. Similarly, the nesting data module 106c may adjust the identification values and subcategory identification values of the subcategorizations in the second data table 306 from 1-3 to 4-6, 2.4, 2.5, and 3.6 within the nested data table 310. Each of these adjusted identification/subcategory identification values in the nested data table 310 may reference the corresponding identification and path values in the nested data table 310 associated with the data categories from the third data table 308.

It should be understood that the example table nesting sequence 300 is for the purposes of discussion only, and that the nesting data module 106c may nest/collapse data tables in other suitable manners.

Figure 4A:
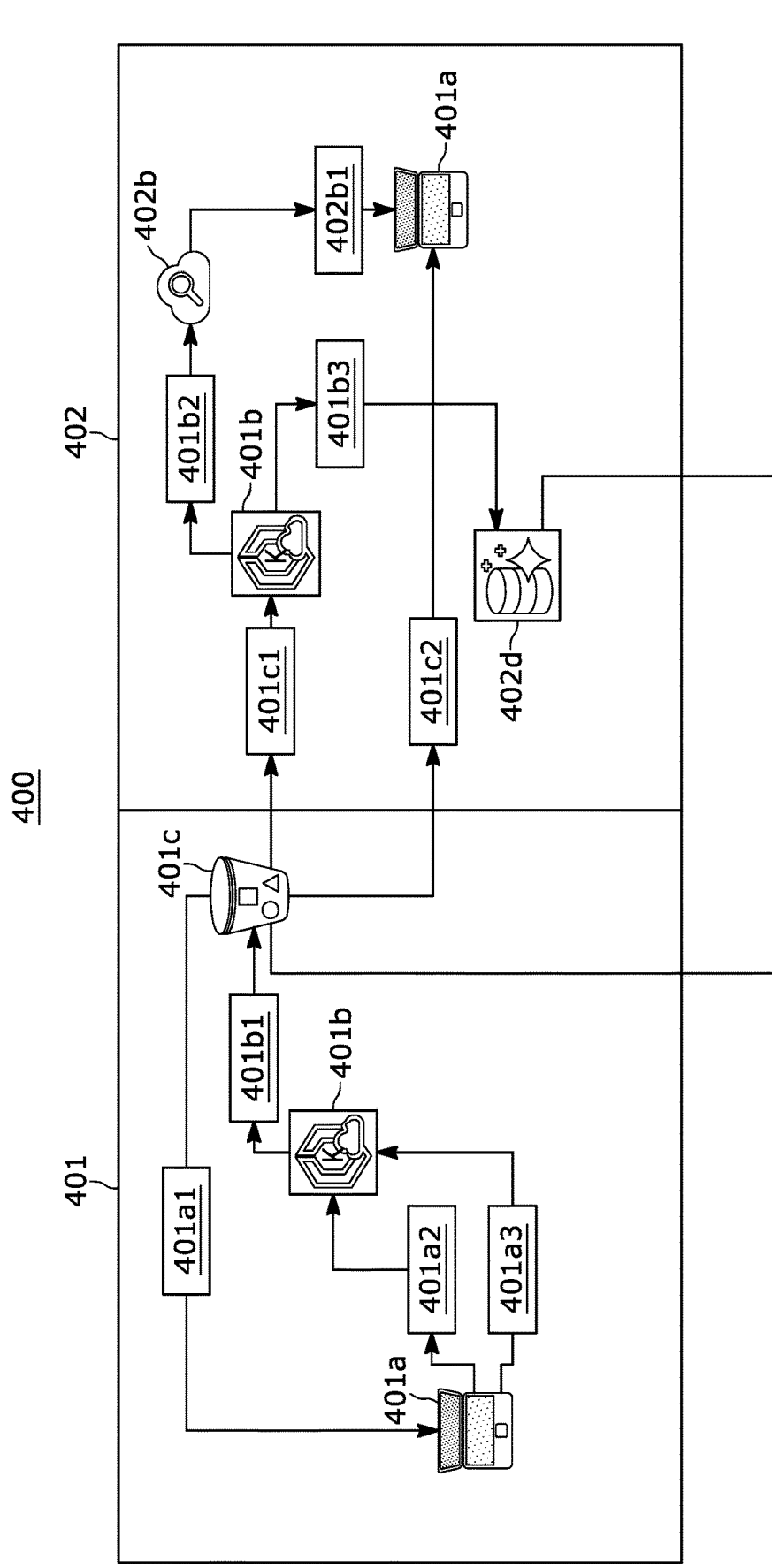
FIG. 4A illustrates an example insight generation architecture utilizing portions of the example computing environment of FIG. 1, in accordance with various embodiments described herein.
Figure 4A:
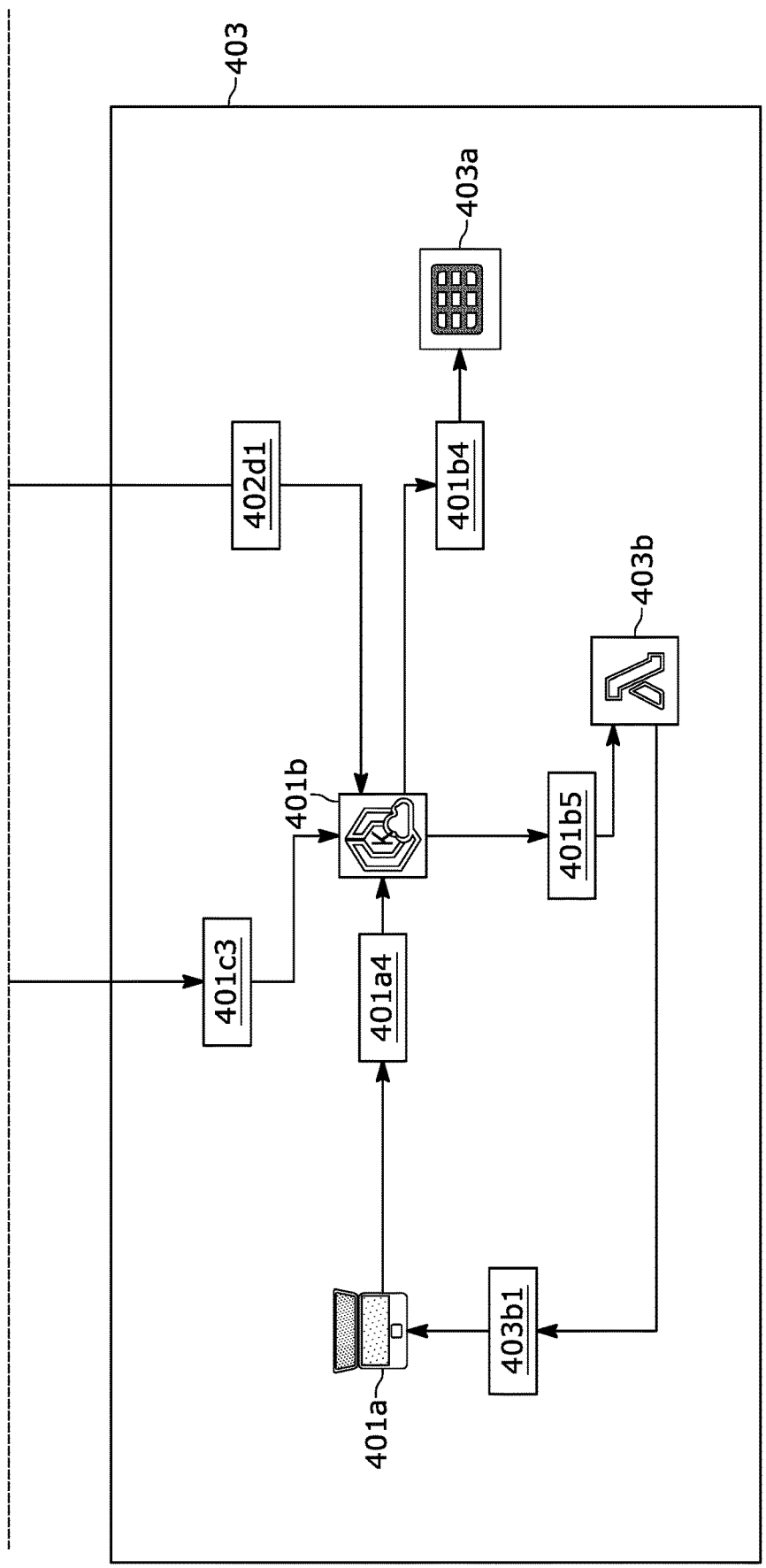

FIG. 4A illustrates an example insight generation architecture 400 utilizing portions of the example computing environment of FIG. 1, in accordance with various embodiments described herein. Generally speaking, the example insight generation architecture 400 includes a document storage branch 401, a data insight branch 402, and a document generation branch 403. The example insight generation architecture 400 further includes a user device 401a, a cloud computing resource 401b, a file storage device 401c, a search index 402b, a relational database 402d, a document generation engine 403a, and a document reporting engine 403b.

The document storage branch 401 includes the user device 401a transmitting a document to the cloud computing resource 401b (blocks 401a2 and 401a3). At block 401a2, the user device 401a may email a document to a data inbox (e.g., data inbox 106i) that is stored at the cloud computing resource 401b. At block 401a3, the user device 401a may directly upload a document to the cloud computing resource 401b. In either case, the cloud computing resource 401b may save these documents to the file storage device 401c. Once stored at the file storage device 401c, the user may access any of these documents by retrieving them from the file storage device 401c to the user device 401a (block 401a1).

The data insight branch 402 includes the cloud computing resource 401b extracting data from documents and/or other files stored in the file storage device 401c and normalizing the extracted data into a normalized/standardized format (block 401c1). The cloud computing resource 401b may then save the normalized/standardized extracted data to the search index 402b (block 401b2), which may then return some/all of the stored data to the user device 401a in response to a search request from the user device 401a (block 402b1). The user device 401a may also access the file storage device 401c directly to view the original document(s)/file(s) from which the normalized/standardized data was extracted, and may generate insights (e.g., statistical analysis, etc.) based on the extracted data and the original documents (block 401c2).

In any event, the data insight branch 402 may further include the cloud computing resource 401b saving and/or transmitting the normalized/standardized data to the relational database 402d (block 401b3). Once stored on the relational database 402d, the cloud computing resource 401b, the user device 401a, and/or other processing device(s) may generate further insights by quickly and efficiently analyzing the data and all/some related data/data categories.

For example, in the document generation branch 403, the cloud computing resource 401b may begin generating relevant documents by fetching relevant documents from the file storage device 401c (block 401c3) and/or by fetching relevant data from the relational database 402d (block 402d1). As part of this document generation, the user device 401a may transmit a document/report request to the cloud computing resource 401b (block 401a4). In response to such a document/report request, the cloud computing resource 401b may fetch the necessary files/data and may utilize the document generation engine 403a to turn the extracted/fetched data from multiple, different documents/reports into a single, new document/report (block 401b4). The cloud computing resource 401b may also cause the document reporting engine 403b to combine multiple, different documents/reports into a single, new document/report (block 401b5).

Namely, the document reporting engine 403b may combine original documents/files uploaded to the file storage device 401c as well as new documents/files produced/generated by, for example, the document generation engine 403a. The document reporting engine 403b may then transmit/report these combined documents/files/reports to the user device 401a, for review and/or other analysis by the user (block 403b1).

Figure 4B:
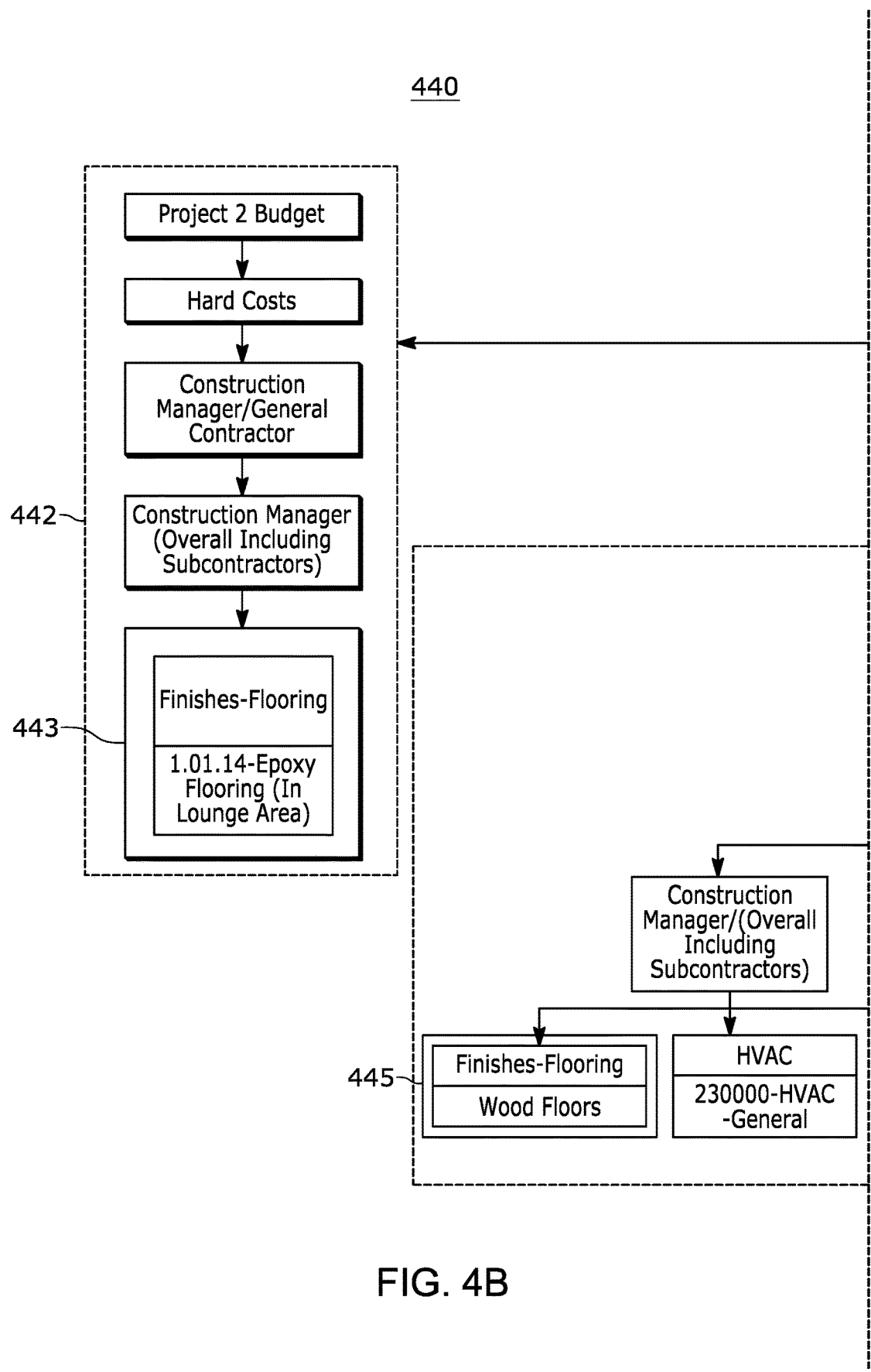
FIG. 4B illustrates an example insight generation sequence, in accordance with various embodiments described herein.
Figure 4B:
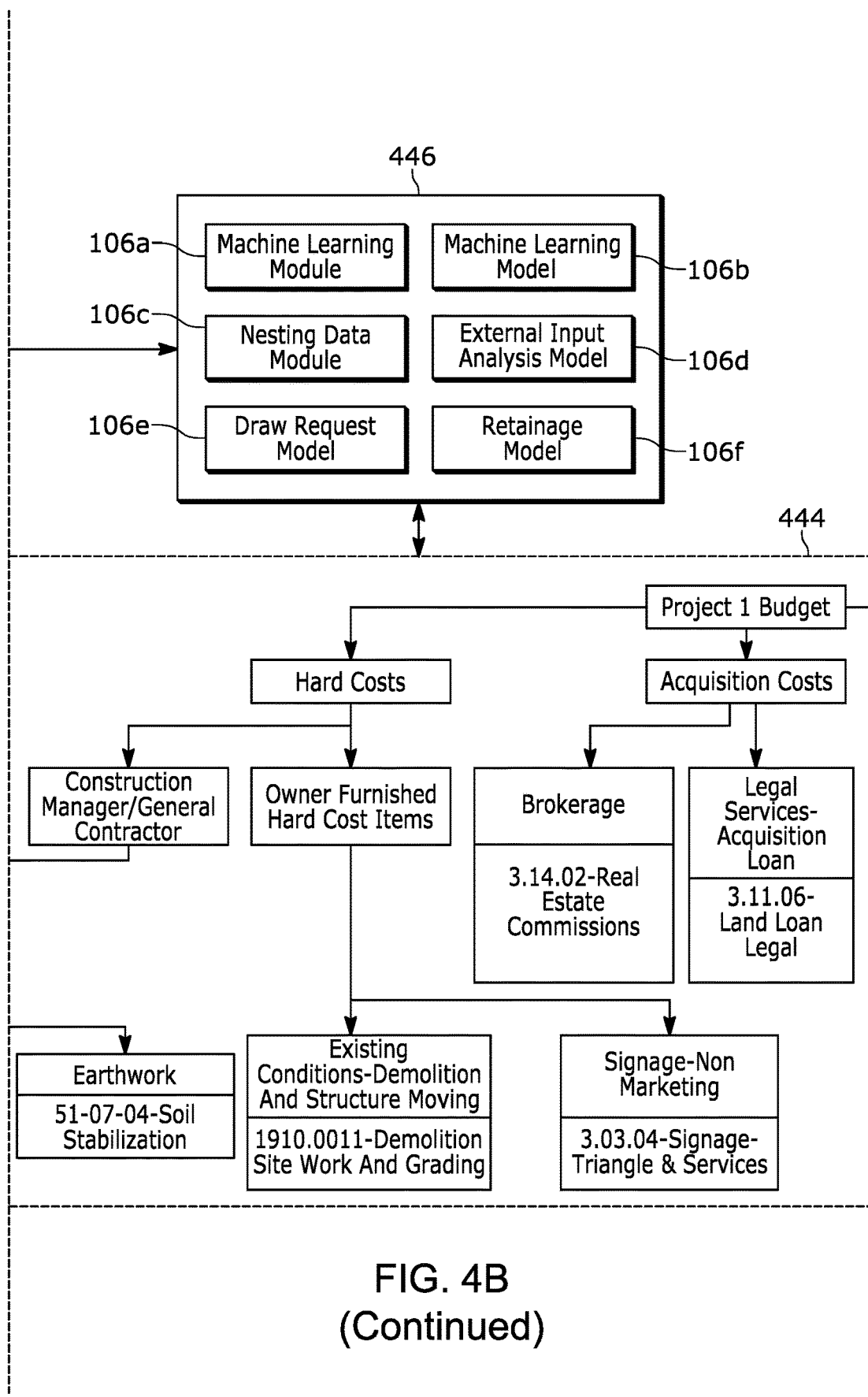
Figure 4B:
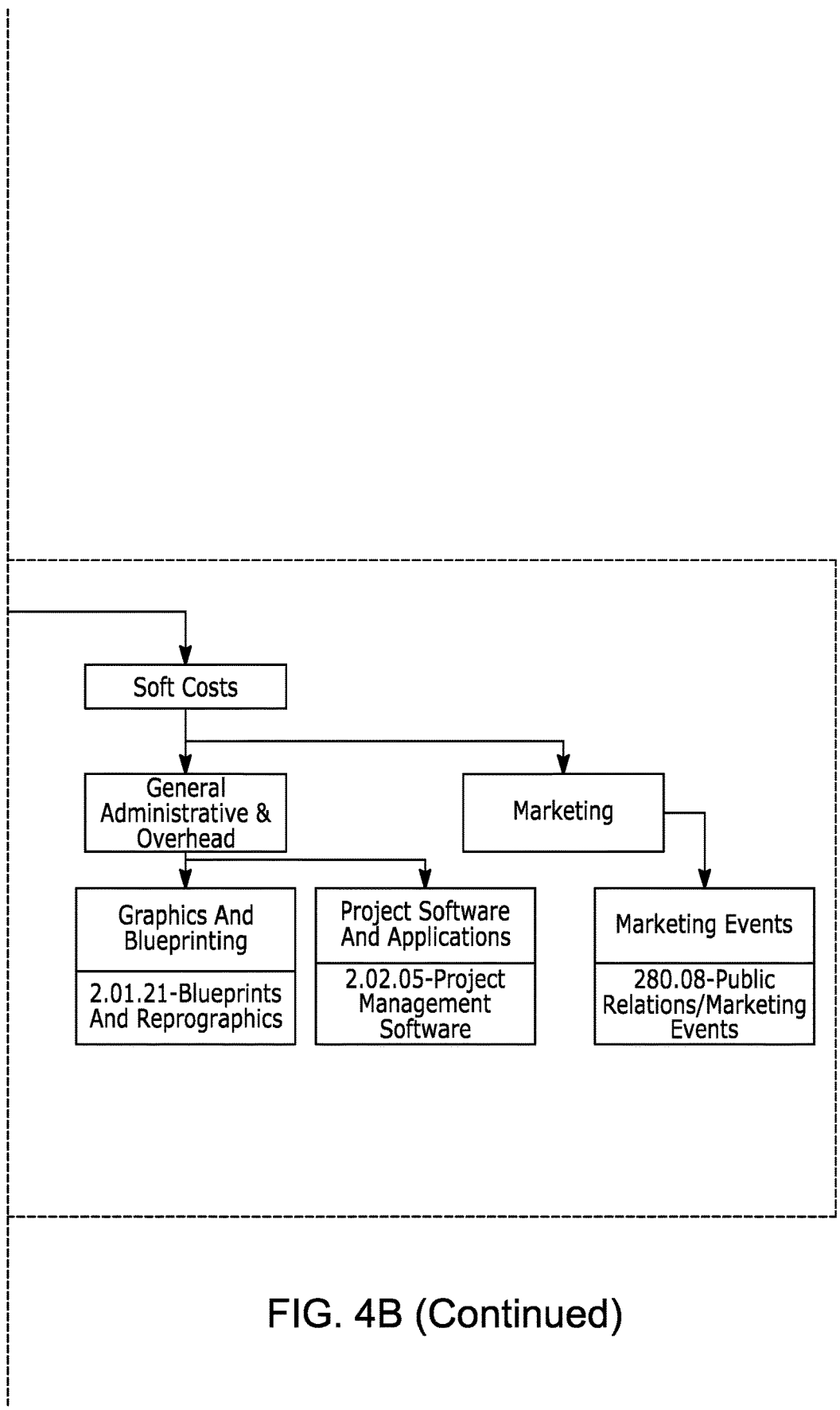

FIG. 4B illustrates an example insight generation sequence 440, in accordance with various embodiments described herein. Generally, the example insight generation sequence 440 includes a first project 442, a second project 444, and a subset of modules/models 446. As illustrated in FIG. 4B, the first project 442 includes a first set of data categories that includes a first data subcategory 443 and the second project 444 includes a second set of data categories that includes a second data subcategory 445. The subset of modules/models 446 generally includes the ML module 106a, the ML model 106b, the nesting data module 106c, the external input analysis model 106d, the draw request model 106e, and the retainage model 106f. As described herein, the example insight generation sequence 440 may utilize any/all of the modules/models included as part of the subset of modules/models 446.

In the example insight generation sequence 440, the subset of modules/models 446 may analyze the set of data and/or data categories/subcategories included in each of the first project 442 and the second project 444 to determine whether any of the data and/or categories/subcategories included therein are similar and/or reference the same normalized data category. For example, the first data subcategory 443 of the first project 442 may include data and/or a data category that is similarly/identically categorized (e.g., "Finishes-Flooring") as the second data subcategory 445 of the second project 444. The subset of modules/models 446 may analyze these similarly/identically categorized subcategories 443, 445 to determine analytics/insights and/or other relationships between the naming conventions and/or the data quantities stored in association with the subcategories 443, 445.

In this example, the specific data type/subcategorization categorized within the "Finishes-Flooring" category of the first data subcategory 443 is "Epoxy Flooring (in lounge area)" and "Wood Floors" within the second data subcategory 445. Thus, the subset of modules/models 446 may compare these subcategories (e.g., "Epoxy Flooring (in lounge area)" and "Wood Floors") and may utilize these similarly categorized subcategories to develop a broader understanding (e.g., via ML module 106a, ML model 106b) of naming conventions that are correctly categorized within "Finishes-Flooring". Further, the subset of modules/models 446 may analyze the data stored within these subcategories 443, 445 to generate analytical insights of the types and/or quantities of the data stored within particular categories (e.g., "Finishes-Flooring") across projects (e.g., first project 442, second project 444) and/or across industries.

Figure 5:
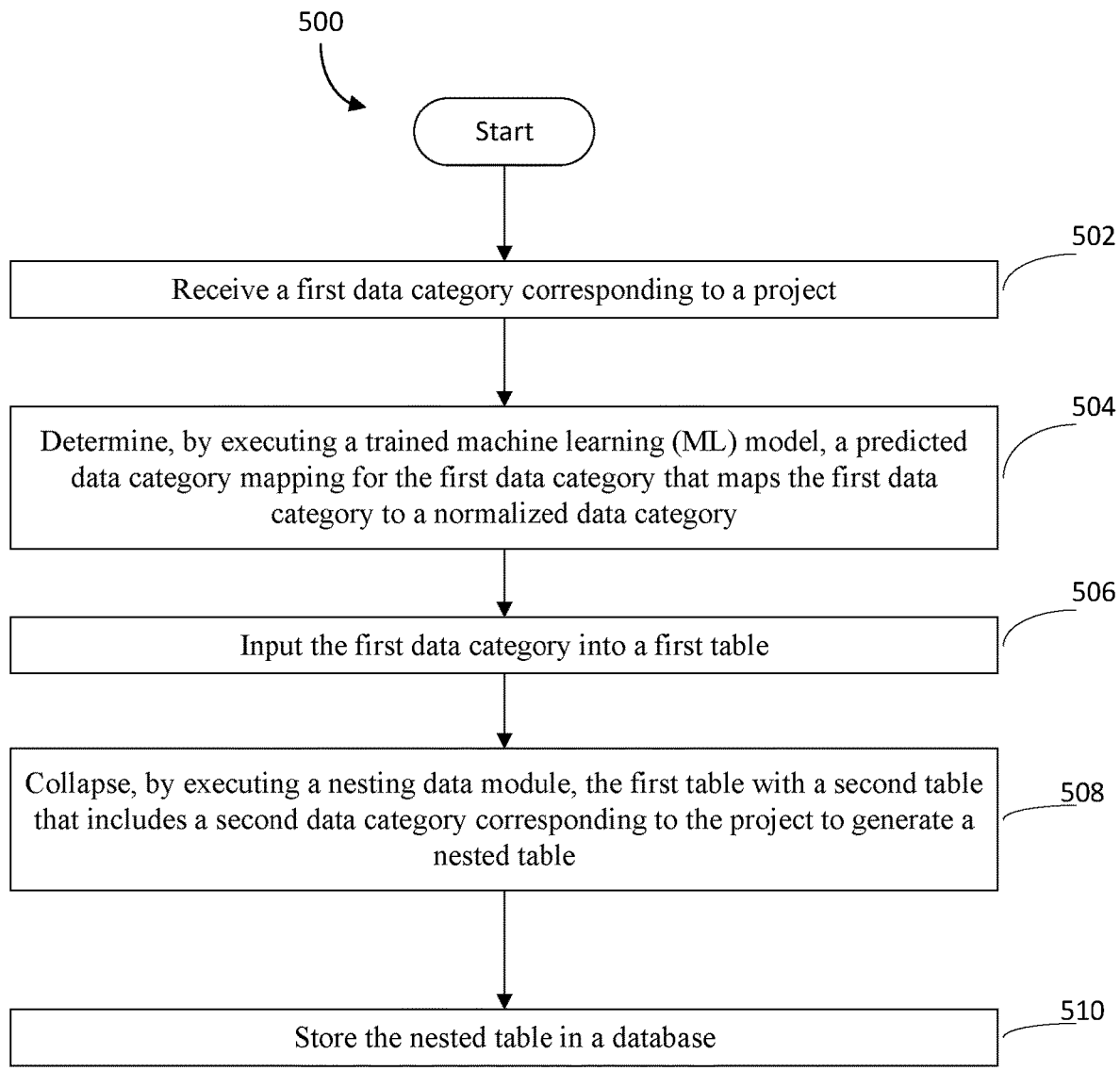
FIG. 5 illustrates an example method for optimizing project data storage, in accordance with various embodiments described herein.

FIG. 5 illustrates an example method 500 for optimizing project data storage, in accordance with various embodiments described herein. At least portions of the method 500 may be performed by one or more processors (e.g., processor(s) 108, 113) utilizing the embodiments of the user computing device 102, the host server 104, and/or the remote server 105 of FIG. 1, for example, or by other suitable modules or systems. In embodiments, the method 500 may include additional or alternate steps other than those described herein.

At block 502, the example method 500 include receiving a first data category corresponding to a project. The example method 500 further includes determining, by executing a trained machine learning (ML) model, a predicted data category mapping for the first data category that maps the first data category to a normalized data category (block 504). The trained ML model may be trained using a plurality of training data categories and a plurality of training normalized data categories as input to output a plurality of training predicted data category mappings. The example method 500 further includes executing, based on the predicted data category mapping, a nesting data module configured to input the first data category into a first table (block 506), and collapse the first table with a second table that includes a second data category corresponding to the project to generate a nested table (block 508). The example method 500 further includes storing the nested table in a database (block 510).

In some aspects, the example method 500 may further include: receiving, at the one or more processors, an external input corresponding to the project; executing, by the one or more processors, an external input analysis model trained to: extract external data from the external input, and analyze the external data to output (i) a predicted classification and (ii) a predicted impact associated with the project; and causing, by the one or more processors, a user computing device to display the predicted classification and the predicted impact to a user.

In some aspects, the example method 500 may further include: determining, by the one or more processors, a classification of the external input based on the predicted classification; updating, by the one or more processors, an entry of a data category within the nested table based on the classification; and adjusting, by the one or more processors, an estimated value within the nested table based on the predicted impact.

In some aspects, the example method 500 may further include: analyzing, by the one or more processors, one or more external inputs to identify request data included as part of the one or more external inputs; extracting, by the one or more processors, the request data from the one or more external inputs; executing, by the one or more processors, a draw request model to identify whether the request data conforms to each of a set of consolidation rules; and responsive to determining that the request data conforms to each of the set of consolidation rules, generating, by the one or more processors using the request data, a draw request that is formatted based on the set of consolidation rules.

In some aspects, the one or more external inputs are in a plurality of different formats when analyzed by the one or more processors, and the example method 500 may further include: converting, by the one or more processors, the one or more external inputs from the plurality of different formats to a normalized format.

In some aspects, the example method 500 may further include: rendering, by the one or more processors, a project projection graphical user interface (GUI) configured to display data stored within the nested table; receiving, at the one or more processors, updated project data; determining, by the one or more processors, that the updated project data violates a threshold value corresponding to a respective data category represented in the project projection GUI; and adjusting, by the one or more processors, a graphical display element of the project projection GUI corresponding to the respective data category based on the updated project data violating the threshold value.

In some aspects, the example method 500 may further include: predicting, by the one or more processors executing a retainage model, a retainage value based on data included in the nested table; receiving, at the one or more processors, updated data to be stored in the nested table; generating, by the one or more processors executing the retainage model using the updated data as inputs, an updated retainage value; and causing, by the one or more processors, a user computing device to display the updated retainage value to a user.

In some aspects, the example method 500 may further include: generating, by the one or more processors, an estimated project completion value based on data included in the nested table; transmitting, by the one or more processors, the estimated project completion value to an external computing device; receiving, at the one or more processors from the external computing device, an adjusted project completion value; and determining, by the one or more processors, an updated project completion value based on the estimated project completion value and the adjusted project completion value.

In some aspects, the example method 500 may further include: causing, by the one or more processors, a user computing device to render a project graphical user interface (GUI) that includes the nested table for access by a user of the user computing device; and responsive to receiving input from the user, executing, by the one or more processors, the nesting data module to expand the nested table into the first table and the second table.

ADDITIONAL CONSIDERATIONS

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although user operations of one or more methods are illustrated and described as separate operations, one or more of the user operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for optimizing project data storage comprising:
   one or more processors; and
   one or more memories communicatively coupled with the one or more processors,
   the one or more memories storing a trained machine learning (ML) model, a set of nesting instructions, a project database, and computer executable instructions that, when executed by the one or more processors, cause the one or more processors to:
      receive a first data category corresponding to a project,
      execute the trained ML model to determine a predicted data category mapping for the first data category that maps the first data category to a normalized data category, wherein the trained ML model is trained using a plurality of training data categories and a plurality of training normalized data categories as input to output a plurality of training predicted data category mappings,
      execute, based on the predicted data category mapping, the set of nesting instructions configured to:
         input the first data category into a first table having a first file size, and
         collapse the first table with a second table by adjusting identification values associated with (i) the first data category and (ii) a second data category in the second table that is related to the first data category into a path value that references both the first data category and the second data category and is stored in a nested table, wherein the second table has a second file size, and the nested table has a third file size based on the path value that is less than a combination of the first file size and the second file size, and
      store the nested table in the project database.

2. The system of claim 1, wherein the computer executable instructions, when executed by the one or more processors, further cause the one or more processors to:
   receive an external input corresponding to the project;
   execute a second ML model trained to:
      extract external data from the external input, and
      analyze the external data to output (i) a predicted classification and (ii) a predicted impact associated with the project; and
   cause a user computing device to display the predicted classification and the predicted impact to a user.

3. The system of claim 2, wherein the computer executable instructions, when executed by the one or more processors, further cause the one or more processors to:
   determine a classification of the external input based on the predicted classification;
   update an entry of a data category within the nested table based on the classification; and
   adjust an estimated value within the nested table based on the predicted impact.

4. The system of claim 1, wherein the computer executable instructions, when executed by the one or more processors, further cause the one or more processors to:
   analyze one or more external inputs to identify request data included as part of the one or more external inputs;
   extract the request data from the one or more external inputs;
   execute an artificial intelligence (AI) model configured to identify whether the request data conforms to each of a set of consolidation rules; and
   responsive to determining that the request data conforms to each of the set of consolidation rules, generate, using the request data, a draw request that is formatted based on the set of consolidation rules.

5. The system of claim 4, wherein the one or more external inputs are in a plurality of different formats when analyzed by the one or more processors, and the computer executable instructions, when executed by the one or more processors, further cause the one or more processors to:
   convert the one or more external inputs from the plurality of different formats to a normalized format.

6. The system of claim 1, wherein the computer executable instructions, when executed by the one or more processors, further cause the one or more processors to:
   render a project projection graphical user interface (GUI) configured to display data stored within the nested table;
   receive updated project data;
   determine that the updated project data violates a threshold value corresponding to a respective data category represented in the project projection GUI; and
   adjust a graphical display element of the project projection GUI corresponding to the respective data category based on the updated project data violating the threshold value.

7. The system of claim 1, wherein the computer executable instructions, when executed by the one or more processors, further cause the one or more processors to:
   predict, by executing a second ML model, a retainage value based on data included in the nested table;
   receive updated data to be stored in the nested table;
   generate, by executing the second ML model using the updated data as inputs, an updated retainage value; and
   cause a user computing device to display the updated retainage value to a user.

8. The system of claim 1, wherein the computer executable instructions, when executed by the one or more processors, further cause the one or more processors to:
   generate an estimated project completion value based on data included in the nested table;
   transmit the estimated project completion value to an external computing device;
   receive, from the external computing device, an adjusted project completion value; and
   determine an updated project completion value based on the estimated project completion value and the adjusted project completion value.

9. The system of claim 1, wherein the computer executable instructions, when executed by the one or more processors, further cause the one or more processors to:
   cause a user computing device to render a project graphical user interface (GUI) that includes the nested table for access by a user of the user computing device; and
   responsive to receiving input from the user, execute the set of nesting instructions to expand the nested table into the first table and the second table.

10. A computer-implemented method for optimizing project data storage comprising:
   receiving, at one or more processors, a first data category corresponding to a project;
   determining, by the one or more processors executing a trained machine learning (ML) model, a predicted data category mapping for the first data category that maps the first data category to a normalized data category, wherein the trained ML model is trained using a plurality of training data categories and a plurality of training normalized data categories as input to output a plurality of training predicted data category mappings;

executing, by the one or more processors and based on the predicted data category mapping, a set of nesting instructions configured to:

input the first data category into a first table having a first file size, and collapse the first table with a second table by adjusting identification values associated with (i) the first data category and (ii) a second data category in the second table that is related to the first data category into a path value that references both the first data category and the second data category and is stored in a nested table, wherein the second table has a second file size, and the nested table has a third file size based on the path value that is less than a combination of the first file size and the second file size; and storing, by the one or more processors, the nested table in a database.

11. The computer-implemented method of claim 10, further comprising:

receiving, at the one or more processors, an external input corresponding to the project;

executing, by the one or more processors, a second ML model trained to:

extract external data from the external input, and analyze the external data to output (i) a predicted classification and (ii) a predicted impact associated with the project; and causing, by the one or more processors, a user computing device to display the predicted classification and the predicted impact to a user.

12. The computer-implemented method of claim 11, further comprising:

determining, by the one or more processors, a classification of the external input based on the predicted classification;

updating, by the one or more processors, an entry of a data category within the nested table based on the classification; and adjusting, by the one or more processors, an estimated value within the nested table based on the predicted impact.

13. The computer-implemented method of claim 10, further comprising:

analyzing, by the one or more processors, one or more external inputs to identify request data included as part of the one or more external inputs;

extracting, by the one or more processors, the request data from the one or more external inputs;

executing, by the one or more processors, an AI model configured to identify whether the request data conforms to each of a set of consolidation rules; and responsive to determining that the request data conforms to each of the set of consolidation rules, generating, by the one or more processors using the request data, a draw request that is formatted based on the set of consolidation rules.

14. The computer-implemented method of claim 13, wherein the one or more external inputs are in a plurality of different formats when analyzed by the one or more processors, and the method further comprises:

converting, by the one or more processors, the one or more external inputs from the plurality of different formats to a normalized format.

15. The computer-implemented method of claim 10, further comprising:

rendering, by the one or more processors, a project projection graphical user interface (GUI) configured to display data stored within the nested table;

receiving, at the one or more processors, updated project data;

determining, by the one or more processors, that the updated project data violates a threshold value corresponding to a respective data category represented in the project projection GUI; and adjusting, by the one or more processors, a graphical display element of the project projection GUI corresponding to the respective data category based on the updated project data violating the threshold value.

16. The computer-implemented method of claim 10, further comprising:

predicting, by the one or more processors executing a second ML model, a retainage value based on data included in the nested table;

receiving, at the one or more processors, updated data to be stored in the nested table;

generating, by the one or more processors executing the second ML model using the updated data as inputs, an updated retainage value; and causing, by the one or more processors, a user computing device to display the updated retainage value to a user.

17. The computer-implemented method of claim 10, further comprising:

generating, by the one or more processors, an estimated project completion value based on data included in the nested table;

transmitting, by the one or more processors, the estimated project completion value to an external computing device;

receiving, at the one or more processors from the external computing device, an adjusted project completion value; and determining, by the one or more processors, an updated project completion value based on the estimated project completion value and the adjusted project completion value.

18. The computer-implemented method of claim 10, further comprising:

causing, by the one or more processors, a user computing device to render a project graphical user interface (GUI) that includes the nested table for access by a user of the user computing device; and responsive to receiving input from the user, executing, by the one or more processors, the set of nesting instructions to expand the nested table into the first table and the second table.

19. A tangible machine-readable medium comprising instructions that, when executed, cause a machine to at least:

receive a first data category corresponding to a project;

execute a trained ML model to determine a predicted data category mapping for the first data category that maps the first data category to a normalized data category, wherein the trained ML model is trained using a plurality of training data categories and a plurality of training normalized data categories as input to output a plurality of training predicted data category mappings;

execute, based on the predicted data category mapping, a set of nesting instructions configured to:

input the first data category into a first table having a first file size, and collapse the first table with a second table by adjusting identification values associated with (i) the first data category and (ii) a second data category in the second table that is related to the first data category into a path value that references both the first data category and the second data category and is stored in a nested table, wherein the second table has a second file size, and the nested table has a third file size based on the path value that is less than a combination of the first file size and the second file size; and store the nested table in a project database.

20. The tangible machine-readable medium of claim 19, wherein the instructions, when executed, further cause the machine to at least:

receive an external input corresponding to the project;
execute a second ML model trained to:
- extract external data from the external input,
- analyze the external data to output (i) a predicted classification and (ii) a predicted impact associated with the project, and
- determine a classification of the external input based on the predicted classification;

update an entry of a data category within the nested table based on the classification;

adjust an estimated value within the nested table based on the predicted impact; and cause a user computing device to display the predicted classification and the predicted impact to a user.

* * * * *